US012579355B2

(12) United States Patent
Scales et al.

(10) Patent No.: US 12,579,355 B2
(45) Date of Patent: Mar. 17, 2026

(54) NEWS FEED GENERATION

(71) Applicant: Notion Labs, Inc., San Francisco, CA (US)

(72) Inventors: Jordan Scales, San Francisco, CA (US); Tyler Beauchamp, San Francisco, CA (US); Connie Fan, San Francisco, CA (US); John Ryan, San Francisco, CA (US); He Lu, San Francisco, CA (US)

(73) Assignee: Notion Labs, Inc., San Francisco, CA (US)

( * ) Notice: Subject to any disclaimer, the term of this patent is extended or adjusted under 35 U.S.C. 154(b) by 115 days.

(21) Appl. No.: 18/596,548

(22) Filed: Mar. 5, 2024

(65) Prior Publication Data

US 2025/0238598 A1     Jul. 24, 2025

Related U.S. Application Data

(60) Provisional application No. 63/624,219, filed on Jan. 23, 2024.

(51) Int. Cl.
| | |
|---|---|
| *G06F 40/166* | (2020.01) |
| *G06F 3/04845* | (2022.01) |
| *G06F 3/04847* | (2022.01) |
| *G06F 40/106* | (2020.01) |
| *G06F 40/186* | (2020.01) |
| *G06F 40/197* | (2020.01) |

(52) U.S. Cl.
CPC ........ *G06F 40/106* (2020.01); *G06F 3/04845* (2013.01); *G06F 3/04847* (2013.01); *G06F 40/166* (2020.01); *G06F 40/186* (2020.01); *G06F 40/197* (2020.01)

(58) Field of Classification Search
CPC .............. G06F 40/106; G06F 3/04845; G06F 3/04847; G06F 40/166; G06F 40/186; G06F 40/197
See application file for complete search history.

(56) References Cited

U.S. PATENT DOCUMENTS

| | | | |
|---|---|---|---|
| 2022/0237255 A1 | 7/2022 | Koren et al. | |
| 2025/0217576 A1* | 7/2025 | Mann .................... | G06F 40/216 |
| 2025/0217581 A1* | 7/2025 | Whitmore ............. | G06F 40/106 |
| 2025/0278526 A1* | 9/2025 | Roper, Jr. ............... | G06F 30/15 |

OTHER PUBLICATIONS

ISA, International Search Report and Written Opinion for International Application No. PCT/US2024/061466, mailed on Mar. 7, 2025, 25 pages.

* cited by examiner

*Primary Examiner* — Phuong H Nguyen
(74) *Attorney, Agent, or Firm* — Perkins Coie LLP; Alberto Araiza; Lena Petrovic

(57) ABSTRACT

Described herein are approaches directed to building and/or managing page layout templates associated with pages having particular page types. Some implementations relate to approaches for hierarchical page layout templates. In some implementations, a graphical page layout template editor can be provided. In some implementations, a large language model can be used to generate page layout templates. Page layout templates can include one or more modules that can define the presence and organization of blocks within a page comprising one or more blocks. Some implementations provide for a news feed that can summarize changes to pages within a workspace, teamspace, database, or other context.

20 Claims, 17 Drawing Sheets parent
{
  id: parent_1
  modules: [
    header,
    metadata,
    contents]
}

506 parent_mid
{
  id: parent_mid
  parent_id: parent_1
  modules: [comments, tasks]
}

504 child
{
  id: child
  parent_id: parent_mid
  remove_modules: [comments]
  order: [header, metadata, tasks,
          contents]
}

502 final
{
  id: final_1
  modules: [
    header,
    metadata,
    tasks,
    contents]
}

508

800

Receive Request for Page
802

Determine Child Page Layout
Template for Requested Page
804

Determine Parent Page Layout
Template Linked to Child Page
Layout Template
806

Compute Final Layout for Page
808

Apply Final Layout to Page Contents
to Generate Page
810

Provide Page to Requestor
812

900

Detect Change to Parent Page Layout Template or Child Page Layout Template
902

Compute Final Page Layout Template from Child Page Layout Template and Parent Page Layout Template
904

Associate Final Page Layout Template with One or More Pages
906

Receive Page Request from Requestor
908

Apply Final Page Layout Template to Requested Page
910

Provide Page to Requestor
912

1100

1400

NEWS FEED GENERATION

CROSS-REFERENCE TO RELATED APPLICATIONS

This application claims the benefit of priority to U.S. Provisional Patent Application No. 63/624,219, filed Jan. 23, 2024, which is hereby incorporated by reference in its entirety.

BACKGROUND

The approaches described in this section are approaches that could be pursued, but not necessarily approaches that have been previously conceived or pursued. Thus, unless otherwise indicated, it should not be assumed that any of the material described in this section qualifies as prior art merely by virtue of its inclusion in this section.

Page layouts play an totally important role in the presentation of information to users. For example, organizational choices, decisions about which content should be displayed, and so forth can have a significant impact on a user's experience. Consistent layouts can be important for maintaining easy navigation, ensuring branding consistency, and so forth.

Different types of information may be better presented using different layouts. For example, a user guide can benefit from a layout that makes it easy to quickly locate information and that avoids displaying unnecessary details, while developer documentation can benefit from a different layout that offers more detailed information. As another example, a to-do (or task) list can be presented in a different manner than a documentation page.

Achieving consistency while enabling flexibility in page layouts to better suit the content presented can be challenging. Existing approaches can be confusing, difficult to use, and difficult to maintain. Accordingly, there is a need for improved approaches to page layouts.

BRIEF DESCRIPTION OF THE DRAWINGS

Reference will now be made, by way of example, to the accompanying drawings, which show example embodiments of the present application and in which.

Figure 1:
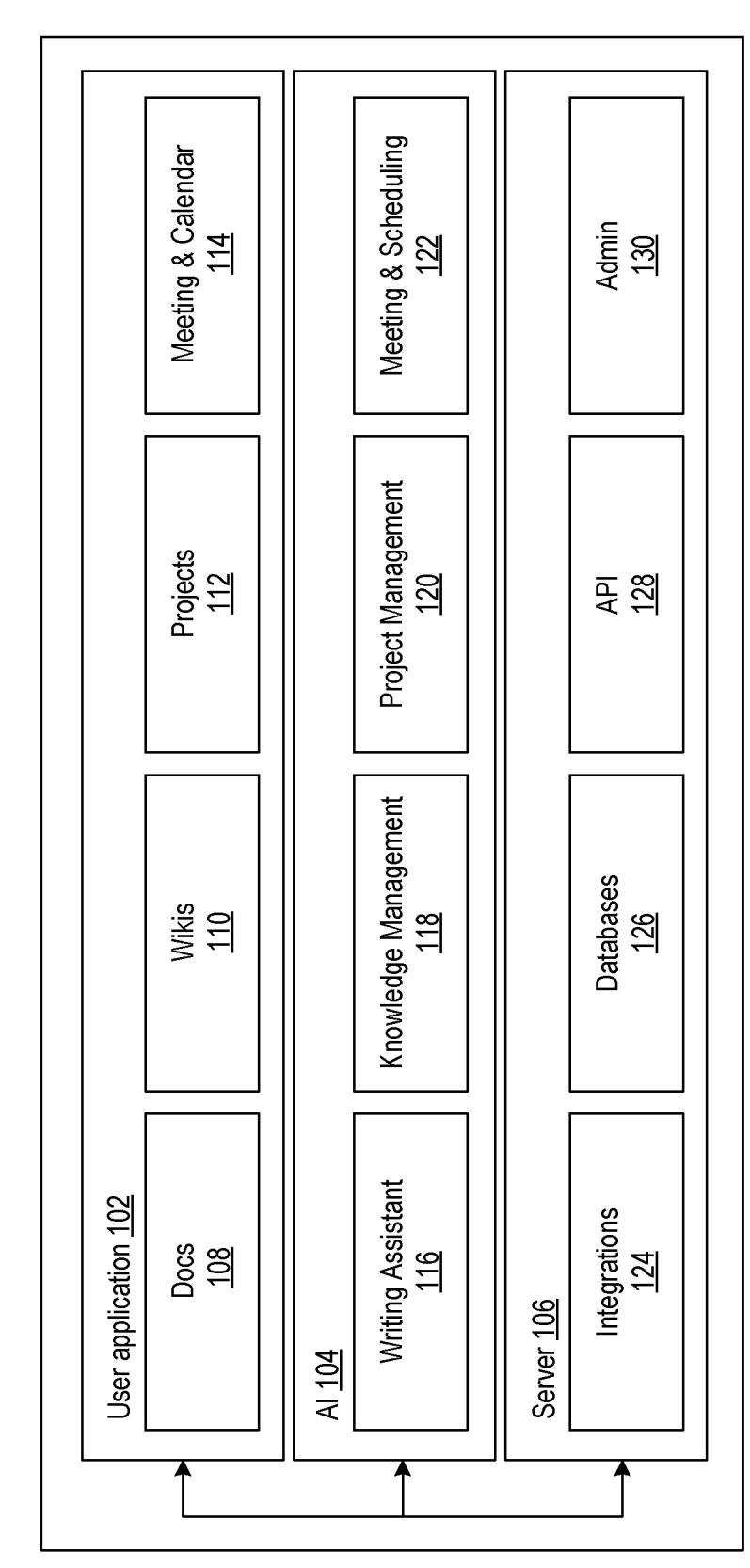
FIG. 1 is a block diagram illustrating a platform, which may be used to implement examples of the present disclosure.

The technologies described herein will become more apparent to those skilled in the art by studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The present technology provides for systems and methods for building and managing page layouts. The approaches described herein can enable hierarchical layouts, which can simplify the process of creating page layouts, help achieve consistency among different page layouts, and so forth. Some approaches herein can enable no-code or low-code creation of page layout templates. Some approaches herein can be used to summarize modifications to pages and/or to validate the content of pages.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Block Data Model

The disclosed technology includes a block data model ("block model"). The blocks are dynamic units of information that can be transformed into other block types and move across workspaces. The block model allows users to customize how their information is moved, organized, and shared. Hence, blocks contain information but are not siloed.

Blocks are singular pieces that represent all units of information inside an editor. In one example, text, images, lists, a row in a database, etc., are all blocks in a workspace. The attributes of a block determine how that information is rendered and organized. Every block can have attributes including an identifier (ID), properties, and type. Each block is uniquely identifiable by its ID. The properties can include a data structure containing custom attributes about a specific block. An example of a property is "title," which stores text content of block types such as paragraphs, lists, and the title of a page. More elaborate block types require additional or different properties, such as a page block in a database with user-defined properties. Every block can have a type, which defines how a block is displayed and how the block's properties are interpreted.

A block has attributes that define its relationship with other blocks. For example, the attribute "content" is an array (or ordered set) of block IDs representing the content inside a block, such as nested bullet items in a bulleted list or the text inside a toggle. The attribute "parent" is the block ID of a block's parent, which can be used for permissions. Blocks can be combined with other blocks to track progress and hold all project information in one place.

A block type is what specifies how the block is rendered in a user interface (UI), and the block's properties and content are interpreted differently depending on that type. Changing the type of a block does not change the block's properties or content—it only changes the type attribute. The information is thus rendered differently or even ignored if the property is not used by that block type. Decoupling property storage from block type allows for efficient transformation and changes to rendering logic and is useful for collaboration.

Blocks can be nested inside of other blocks (e.g., infinitely nested sub-pages inside of pages). The content attribute of a block stores the array of block IDs (or pointers) referencing those nested blocks. Each block defines the position and order in which its content blocks are rendered. This hierarchical relationship between blocks and their render children are referred to herein as a "render tree." In one example, page blocks display their content in a new page, instead of rendering it indented in the current page. To see this content, a user would need to click into the new page.

In the block model, indentation is structural (e.g., reflects the structure of the render tree). In other words, when a user indents something, the user is manipulating relationships between blocks and their content, not just adding a style. For example, pressing Indent in a content block can add that block to the content of the nearest sibling block in the content tree.

Blocks can inherit permissions of blocks in which they are located (which are above them in the tree). Consider a page: to read its contents, a user must be able to read the blocks within that page. However, there are two reasons one cannot use the content array to build the permissions system. First, blocks are allowed to be referenced by multiple content arrays to simplify collaboration and a concurrency model. But because a block can be referenced in multiple places, it is ambiguous which block it would inherit permissions from. The second reason is mechanical. To implement permission checks for a block, one needs to look up the tree, getting that block's ancestors all the way up to the root of the tree (which is the workspace). Trying to find this ancestor path by searching through all blocks' content arrays is inefficient, especially on the client. Instead, the model uses an "upward pointer"—the parent attribute—for the permission system. The upward parent pointers and the downward content pointers mirror each other.

A block's life starts on the client. When a user takes an action in the interface—typing in the editor, dragging blocks around a page—these changes are expressed as operations that create or update a single record. The "records" refer to persisted data, such as blocks, users, workspaces, etc. Because many actions usually change more than one record, operations are batched into transactions that are committed (or rejected) by the server as a group.

Creating and updating blocks can be performed by, for example, pressing Enter on a keyboard. First, the client defines all the initial attributes of the block, generating a new unique ID, setting the appropriate block type (to_do), and filling in the block's properties (an empty title, and checked: [["No"]]). The client builds operations to represent the creation of a new block with those attributes. New blocks are not created in isolation: blocks are also added to their parent's content array, so they are in the correct position in the content tree. As such, the client also generates an operation to do so. All these individual change operations are grouped into a transaction. Then, the client applies the operations in the transaction to its local state. New block objects are created in memory and existing blocks are modified. In native apps, the model caches all records that are accessed locally in an LRU (least recently used) cache on top of SQLite or IndexedDB, referred to as RecordCache. When records are changed on a native app, the model also updates the local copies in RecordCache. The editor re-renders to draw the newly created block onto the display. At the same time, the transaction is saved into TransactionQueue, the part of the client responsible for sending all transactions to the model's servers so that the data is persisted and shared with collaborators. TransactionQueue stores transactions safely in IndexedDB or SQLite (depending on the platform) until they are persisted by the server or rejected.

A block can be saved on a server to be shared with others. Usually, TransactionQueue sits empty, so the transaction to create the block is sent to the server in an application programming interface (API) request. In one example, the transaction data is serialized to JavaScript object notation (JSON) and posted to the/saveTransactions API endpoint. SaveTransactions gets the data into source-of-truth databases, which store all block data as well as other kinds of persistent records. Once the request reaches the API server, all the blocks and parents involved in the transaction are loaded. This gives a "before" picture in memory. The block model duplicates the "before" data that had just been loaded in memory. Next, the block model applies the operations in the transaction to the new copy to create the "after" data. Then the model uses both "before" and "after" data to validate the changes for permissions and data coherency. If everything checks out, all created or changed records are committed to the database—meaning the block has now officially been created. At this point, a "success" HTTP response to the original API request is sent by the client. This confirms that the client knows the transaction was saved successfully and that it can move on to saving the next transaction in the TransactionQueue. In the background, the block model schedules additional work depending on the kind of change made for the transaction. For example, the block model can schedule version history snapshots and indexing block text for a Quick Find function. The block model also notifies MessageStore, which is a real-time updates service, about the changes that were made.

The block model provides real-time updates to, for example, almost instantaneously show new blocks to members of a teamspace. Every client can have a long-lived WebSocket connection to the MessageStore. When the client renders a block (or page, or any other kind of record), the client subscribes to changes of that record from Message-Store using the WebSocket connection. When a team member opens the same page, the member is subscribed to changes of all those blocks. After changes have been made through the saveTransactions process, the API notifies MessageStore of new recorded versions. MessageStore finds client connections subscribed to those changing records and passes on the new version through their WebSocket connection. When a team member's client receives version update notifications from MessageStore, it verifies that version of the block in its local cache. Because the versions from the notification and the local block are different, the client sends a syncRecordValues API request to the server with the list of outdated client records. The server responds with the new record data. The client uses this response data to update the local cache with the new version of the records, then re-renders the user interface to display the latest block data.

Blocks can be shared instantaneously with collaborators. In one example, a page is loaded using only local data. On the web, block data is pulled from being in memory. On native apps, loading blocks that are not in memory are loaded from the RecordCache persisted storage. However, if missing block data is needed, the data is requested from an API. The API method for loading the data for a page is referred to herein as loadPageChunk; it descends from a starting point (likely the block ID of a page block) down the content tree and returns the blocks in the content tree plus any dependent records needed to properly render those blocks. Several layers of caching for loadPageChunk are used, but in the worst case, this API might need to make multiple trips to the database as it recursively crawls down the tree to find blocks and their record dependencies. All data loaded by loadPageChunk is put into memory (and saved in the RecordCache if using the app). Once the data is in memory, the page is laid out and rendered using React.

Software Platform

FIG. 1 is a block diagram of an example platform 100. The platform 100 provides users with an all-in-one workspace for data and project management. The platform 100 can include a user application 102, an artificial intelligence (AI) tool 104, and a server 106. The user application 102, the AI tool 104, and the server 106 are in communication with each other via a network.

In some implementations, the user application 102 is a cross-platform software application configured to work on several computing platforms and web browsers. The user application 102 can include a variety of templates. A template refers to a prebuilt page that a user can add to a workspace within the user application 102. The templates can be directed to a variety of functions. Exemplary templates include a docs template 108, a wikis template 110, a projects template 112, and a meeting and calendar template 114. In some implementations, a user can generate, save, and share customized templates with other users.

The user application 102 templates can be based on content "blocks." For example, the templates of the user application 102 include a predefined and/or pre-organized set of blocks that can be customized by the user. Blocks are content containers within a template that can include text, images, objects, tables, maps, and/or other pages (e.g., nested pages or sub-pages). Blocks can be assigned to certain properties. The blocks are defined by boundaries having dimensions. The boundaries can be visible or non-visible for users. For example, a block can be assigned as a text block (e.g., a block including text content), a heading block (e.g., a block including a heading) or a subheading block having a specific location and style to assist in organizing a page. A block can be assigned as a list block to include content in a list format. A block can be assigned as an AI prompt block (also referred to as a "prompt block") that enables a user to provide instructions (e.g., prompts) to the AI tool 104 to perform functions. A block can also be assigned to include audio, video, or image content.

A user can add, edit, and remove content from the blocks. The user can also organize the content within a page by moving the blocks around. In some implementations, the blocks are shared (e.g., by copying and pasting) between the different templates within a workspace. For example, a block embedded within multiple templates can be configured to show edits synchronously.

The docs template 108 is a document generation and organization tool that can be used for generating a variety of documents. For example, the docs template 108 can be used to generate pages that are easy to organize, navigate, and format. The wikis template 110 is a knowledge management application having features similar to the pages generated by the docs template 108 but that can additionally be used as a database. The wikis template 110 can include, for example, tags configured to categorize pages by topic and/or include an indication of whether the provided information is verified to indicate its accuracy and reliability. The projects template 112 is a project management and note-taking software tool. The projects template 112 can allow the users, either as individuals or as teams, to plan, manage, and execute projects in a single forum. The meeting and calendar template 114 is a tool for managing tasks and timelines. In addition to traditional calendar features, the meeting and calendar template 114 can include blocks for categorizing and prioritizing scheduled tasks, generating to-do and action item lists, tracking productivity, etc. The various templates of the user application 102 can be included under a single workspace and include synchronized blocks. For example, a user can update a project deadline on the projects template 112, which can be automatically synchronized to the meeting and calendar template 114. The various templates of the user application 102 can be shared within a team, allowing multiple users to modify and update the workspace concurrently.

The AI tool 104 is an integrated AI assistant that enables AI-based functions for the user application 102. In one example, the AI tool 104 is based on a neural network architecture, such as the transformer 212 described in FIG. 2. The AI tool 104 can interact with blocks embedded within the templates on a workspace of the user application 102. For example, the AI tool 104 can include a writing assistant tool 116, a knowledge management tool 118, a project management tool 120, and a meeting and scheduling tool 122. The different tools of the AI tool 104 can be interconnected and interact with different blocks and templates of the user application 102.

The writing assistant tool 116 can operate as a generative AI tool for creating content for the blocks in accordance with instructions received from a user. Creating the content can include, for example, summarizing, generating new text, or brainstorming ideas. For example, in response to a prompt received as a user input that instructs the AI to describe what the climate is like in New York, the writing assistant tool 116 can generate a block including a text that describes the climate in New York. As another example, in response to a prompt that requests ideas on how to name a pet, the writing assistant tool 116 can generate a block including a list of creative pet names. The writing assistant tool 116 can also operate to modify existing text. For example, the writing assistant can shorten, lengthen, or translate existing text, correct grammar and typographical errors, or modify the style of the text (e.g., a social media style versus a formal style).

The knowledge management tool 118 can use AI to categorize, organize, and share knowledge included in the workspace. In some implementations, the knowledge management tool 118 can operate as a question-and-answer assistant. For example, a user can provide instructions on a prompt block to ask a question. In response to receiving the question, the knowledge management tool 118 can provide an answer to the question, for example, based on information included in the wikis template 110. The project management tool 120 can provide AI support for the projects template 112. The AI support can include auto filling information based on changes within the workspace or automatically track project development. For example, the project management tool 120 can use AI for task automation, data analysis, real-time monitoring of project development, allocation of resources, and/or risk mitigation. The meeting and scheduling tool 122 can use AI to organize meeting notes, unify meeting records, list key information from meeting minutes, and/or connect meeting notes with deliverable deadlines.

The server 106 can include various units (e.g., including compute and storage units) that enable the operations of the AI tool 104 and workspaces of the user application 102. The server 106 can include an integrations unit 124, an application programming interface (API) 128, databases 126, and an administration (admin) unit 130. The databases 126 are configured to store data associated with the blocks. The data associated with the blocks can include information about the content included in the blocks, the function associated with the blocks, and/or any other information related to the blocks. The API 128 can be configured to communicate the block data between the user application 102, the AI tool 104, and the databases 126. The API 128 can also be configured to communicate with remote server systems, such as AI systems. For example, when a user performs a transaction within a block of a template of the user application 102 (e.g., in a docs template 108), the API 128 processes the transaction and saves the changes associated with the transaction to the database 126. The integrations unit 124 is a tool connecting the platform 200 with external systems and software platforms. Such external systems and platforms can include other databases (e.g., cloud storage spaces), messaging software applications, or audio or video conference applications. The administration unit 130 is configured to manage and maintain the operations and tasks of the server 106. For example, the administration unit 130 can manage user accounts, data storage, security, performance monitoring, etc.

Transformer for Neural Network

To assist in understanding the present disclosure, some concepts relevant to neural networks and machine learning (ML) are discussed herein. Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer")

and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which are not discussed in detail here.

A deep neural network (DNN) is a type of neural network having multiple layers and/or a large number of neurons. The term DNN can encompass any neural network having multiple layers, including convolutional neural networks (CNNs), recurrent neural networks (RNNs), multilayer perceptrons (MLPs), Generative Adversarial Networks (GANs), Variational Autoencoders (VAEs), and Auto-regressive Models, among others.

DNNs are often used as ML-based models for modeling complex behaviors (e.g., human language, image recognition, object classification, etc.) in order to improve the accuracy of outputs (e.g., more accurate predictions) such as, for example, as compared with models with fewer layers. In the present disclosure, the term "ML-based model" or more simply "ML model" may be understood to refer to a DNN. Training an ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model.

As an example, to train an ML model that is intended to model human language (also referred to as a "language model"), the training dataset may be a collection of text documents, referred to as a "text corpus" (or simply referred to as a "corpus"). The corpus may represent a language domain (e.g., a single language), a subject domain (e.g., scientific papers), and/or may encompass another domain or domains, be they larger or smaller than a single language or subject domain. For example, a relatively large, multilingual, and non-subject-specific corpus can be created by extracting text from online webpages and/or publicly available social media posts. Training data can be annotated with ground truth labels (e.g., each data entry in the training dataset can be paired with a label) or may be unlabeled.

Training an ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or can be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data can be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters can be determined based on the measured performance of one or more of the trained ML models, and the first step of training (e.g., with the training set) may begin again on a different ML model described by the new set of determined hyperparameters. In this way, these steps can be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training an ML model. Backpropagation is used to adjust (e.g., update) the value of the parameters in the ML model, with the goal of optimizing the objective function. For example, a defined loss function is calculated by forward propagation of an input to obtain an output of the ML model and a comparison of the output value with the target value. Backpropagation calculates a gradient of the loss function with respect to the parameters of the ML model, and a gradient algorithm (e.g., gradient descent) is used to update (e.g., "learn") the parameters to reduce the loss function. Backpropagation is performed iteratively so that the loss function is converged or minimized. Other techniques for learning the parameters of the ML model can be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters can then be fixed, and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of an ML model typically involves further training the ML model on a number of data samples (which may be smaller in number/cardinality than those used to train the model initially) that closely target the specific task. For example, an ML model for generating natural language that has been trained generically on publicly available text corpora may be, e.g., fine-tuned by further training using specific training samples. The specific training samples can be used to generate language in a certain style or in a certain format. For example, the ML model can be trained to generate a blog post having a particular style and structure with a given topic.

Some concepts in ML-based language models are now discussed. It may be noted that, while the term "language model" has been commonly used to refer to an ML-based language model, there could exist non-ML language models. In the present disclosure, the term "language model" can refer to an ML-based language model (e.g., a language model that is implemented using a neural network or other ML architecture), unless stated otherwise. For example, unless stated otherwise, the "language model" encompasses large language models (LLMs).

A language model can use a neural network (typically a DNN) to perform natural language processing (NLP) tasks. A language model can be trained to model how words relate to each other in a textual sequence, based on probabilities. A language model may contain hundreds of thousands of learned parameters or, in the case of an LLM, can contain millions or billions of learned parameters or more. As non-limiting examples, a language model can generate text, translate text, summarize text, answer questions, write code (e.g., Python, JavaScript, or other programming languages), classify text (e.g., to identify spam emails), create content for various purposes (e.g., social media content, factual content, or marketing content), or create personalized content for a particular individual or group of individuals. Language models can also be used for chatbots (e.g., virtual assistance).

A type of neural network architecture, referred to as a "transformer," can be used for language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as recurrent neural network (RNN)-based language models.

Figure 2:
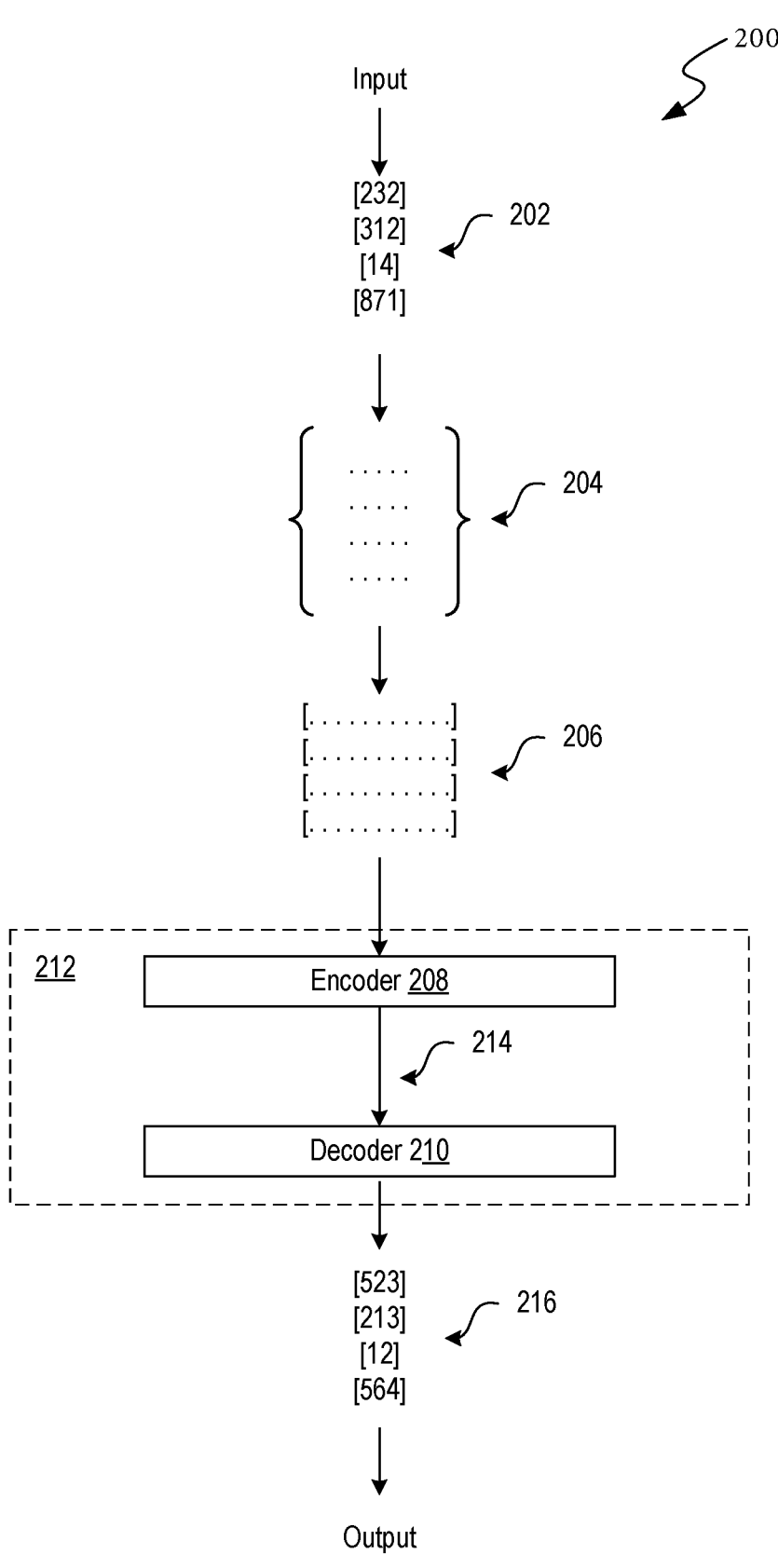
FIG. 2 is a block diagram of a transformer neural network, which may be used in examples of the present disclosure.

FIG. 2 is a block diagram of an example transformer 212. A transformer is a type of neural network architecture that uses self-attention mechanisms to generate predicted output based on input data that has some sequential meaning (e.g., the order of the input data is meaningful, which is the case for most text input). Self-attention is a mechanism that relates different positions of a single sequence to compute a representation of the same sequence. Although transformer-based language models are described herein, the present disclosure may be applicable to any ML-based language model, including language models based on other neural network architectures such as recurrent neural network (RNN)-based language models.

The transformer 212 includes an encoder 208 (which can include one or more encoder layers/blocks connected in series) and a decoder 210 (which can include one or more decoder layers/blocks connected in series). Generally, the encoder 208 and the decoder 210 each include multiple neural network layers, at least one of which can be a self-attention layer. The parameters of the neural network layers can be referred to as the parameters of the language model.

The transformer 212 can be trained to perform certain functions on a natural language input. Examples of the functions include summarizing existing content, brainstorming ideas, writing a rough draft, fixing spelling and grammar, and translating content. Summarizing can include extracting key points or themes from an existing content in a high-level summary. Brainstorming ideas can include generating a list of ideas based on provided input. For example, the ML model can generate a list of names for a startup or costumes for an upcoming party. Writing a rough draft can include generating writing in a particular style that could be useful as a starting point for the user's writing. The style can be identified as, e.g., an email, a blog post, a social media post, or a poem. Fixing spelling and grammar can include correcting errors in an existing input text. Translating can include converting an existing input text into a variety of different languages. In some implementations, the transformer 212 is trained to perform certain functions on other input formats than natural language input. For example, the input can include objects, images, audio content, or video content, or a combination thereof.

The transformer 212 can be trained on a text corpus that is labeled (e.g., annotated to indicate verbs, nouns) or unlabeled. LLMs can be trained on a large unlabeled corpus. The term "language model," as used herein, can include an ML-based language model (e.g., a language model that is implemented using a neural network or other ML architecture), unless stated otherwise. Some LLMs can be trained on a large multi-language, multi-domain corpus to enable the model to be versatile at a variety of language-based tasks such as generative tasks (e.g., generating human-like natural language responses to natural language input).

FIG. 2 illustrates an example of how the transformer 212 can process textual input data. Input to a language model (whether transformer-based or otherwise) typically is in the form of natural language that can be parsed into tokens. The term "token" in the context of language models and NLP has a different meaning from the use of the same term in other contexts such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token can be an integer that corresponds to the index of a text segment (e.g., a word) in a vocabulary dataset. Often, the vocabulary dataset is arranged by frequency of use. Commonly occurring text, such as punctuation, can have a lower vocabulary index in the dataset and thus be represented by a token having a smaller integer value than less commonly occurring text. Tokens frequently correspond to words, with or without white space appended. In some implementations, a token can correspond to a portion of a word.

For example, the word "greater" can be represented by a token for [great] and a second token for [er]. In another example, the text sequence "write a summary" can be parsed into the segments [write], [a], and [summary], each of which can be represented by a respective numerical token. In addition to tokens that are parsed from the textual sequence (e.g., tokens that correspond to words and punctuation), there can also be special tokens to encode non-textual information. For example, a [CLASS] token can be a special token that corresponds to a classification of the textual sequence (e.g., can classify the textual sequence as a list, a paragraph), an [EOT] token can be another special token that indicates the end of the textual sequence, other tokens can provide formatting information, etc.

In FIG. 2, a short sequence of tokens 202 corresponding to the input text is illustrated as input to the transformer 212. Tokenization of the text sequence into the tokens 202 can be performed by some pre-processing tokenization module such as, for example, a byte-pair encoding tokenizer (the "pre" referring to the tokenization occurring prior to the processing of the tokenized input by the LLM), which is not shown in FIG. 2 for brevity. In general, the token sequence that is inputted to the transformer 212 can be of any length up to a maximum length defined based on the dimensions of the transformer 212. Each token 202 in the token sequence is converted into an embedding vector 206 (also referred to as "embedding 206").

An embedding 206 is a learned numerical representation (such as, for example, a vector) of a token that captures some semantic meaning of the text segment represented by the token 202. The embedding 206 represents the text segment corresponding to the token 202 in a way such that embeddings corresponding to semantically related text are closer to each other in a vector space than embeddings corresponding to semantically unrelated text. For example, assuming that the words "write," "a," and "summary" each correspond to, respectively, a "write" token, an "a" token, and a "summary" token when tokenized, the embedding 206 corresponding to the "write" token will be closer to another embedding corresponding to the "jot down" token in the vector space as compared to the distance between the embedding 206 corresponding to the "write" token and another embedding corresponding to the "summary" token.

The vector space can be defined by the dimensions and values of the embedding vectors. Various techniques can be used to convert a token 202 to an embedding 206. For example, another trained ML model can be used to convert the token 202 into an embedding 206. In particular, another trained ML model can be used to convert the token 202 into an embedding 206 in a way that encodes additional information into the embedding 206 (e.g., a trained ML model can encode positional information about the position of the token 202 in the text sequence into the embedding 206). In some implementations, the numerical value of the token 202 can be used to look up the corresponding embedding in an embedding matrix 204, which can be learned during training of the transformer 212.

The generated embeddings 206 are input into the encoder 208. The encoder 208 serves to encode the embeddings 206 into feature vectors 214 that represent the latent features of the embeddings 206. The encoder 208 can encode positional information (i.e., information about the sequence of the input) in the feature vectors 214. The feature vectors 214 can have very high dimensionality (e.g., on the order of thousands or tens of thousands), with each element in a feature vector 214 corresponding to a respective feature. The numerical weight of each element in a feature vector 214 represents the importance of the corresponding feature. The space of all possible feature vectors 214 that can be generated by the encoder 208 can be referred to as a latent space or feature space.

Conceptually, the decoder 210 is designed to map the features represented by the feature vectors 214 into meaningful output, which can depend on the task that was assigned to the transformer 212. For example, if the transformer 212 is used for a translation task, the decoder 210 can map the feature vectors 214 into text output in a target language different from the language of the original tokens 202. Generally, in a generative language model, the decoder 210 serves to decode the feature vectors 214 into a sequence of tokens. The decoder 210 can generate output tokens 216 one by one. Each output token 216 can be fed back as input to the decoder 210 in order to generate the next output token 216. By feeding back the generated output and applying self-attention, the decoder 210 can generate a sequence of output tokens 216 that has sequential meaning (e.g., the resulting output text sequence is understandable as a sentence and obeys grammatical rules). The decoder 210 can generate output tokens 216 until a special [EOT] token (indicating the end of the text) is generated. The resulting sequence of output tokens 216 can then be converted to a text sequence in post-processing. For example, each output token 216 can be an integer number that corresponds to a vocabulary index. By looking up the text segment using the vocabulary index, the text segment corresponding to each output token 216 can be retrieved, the text segments can be concatenated together, and the final output text sequence can be obtained.

In some implementations, the input provided to the transformer 212 includes instructions to perform a function on an existing text. The output can include, for example, a modified version of the input text and instructions to modify the text. The modification can include summarizing, translating, correcting grammar or spelling, changing the style of the input text, lengthening or shortening the text, or changing the format of the text (e.g., adding bullet points or checkboxes). As an example, the input text can include meeting notes prepared by a user and the output can include a high-level summary of the meeting notes. In other examples, the input provided to the transformer includes a question or a request to generate text. The output can include a response to the question, text associated with the request, or a list of ideas associated with the request. For example, the input can include the question "What is the weather like in San Francisco?" and the output can include a description of the weather in San Francisco. As another example, the input can include a request to brainstorm names for a flower shop and the output can include a list of relevant names.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that can be considered to be an encoder-only language model. A decoder-only language model accepts embeddings as input and can use auto-regression to generate an output text sequence. Transformer-XL and GPT-type models can be language models that are considered to be decoder-only language models.

Because GPT-type language models tend to have a large number of parameters, these language models can be considered LLMs. An example of a GPT-type LLM is GPT-3. GPT-3 is a type of GPT language model that has been trained (in an unsupervised manner) on a large corpus derived from documents available online to the public. GPT-3 has a very large number of learned parameters (on the order of hundreds of billions), can accept a large number of tokens as input (e.g., up to 2,048 input tokens), and is able to generate a large number of tokens as output (e.g., up to 2,048 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system can access a remote language model (e.g., a cloud-based language model), such as ChatGPT or GPT-3, via a software interface (e.g., an API). Additionally or alternatively, such a remote language model can be accessed via a network such as the Internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ multiple processors (e.g., hardware processors such as, for example, processors of cooperating computer systems). Indeed, processing of inputs by an LLM can be computationally expensive/can involve a large number of operations (e.g., many instructions can be executed/large data structures can be accessed from memory), and providing output in a required timeframe (e.g., real time or near real time) can require the use of a plurality of processors/cooperating computing devices as discussed above.

Inputs to an LLM can be referred to as a prompt, which is a natural language input that includes instructions to the LLM to generate a desired output. A computer system can generate a prompt that is provided as input to the LLM via an API (e.g., the API 128 in FIG. 1). As described above, the prompt can optionally be processed or pre-processed into a token sequence prior to being provided as input to the LLM via its API. A prompt can include one or more examples of the desired output, which provides the LLM with additional information to enable the LLM to generate output according to the desired output. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

Hierarchical Organizational Blocks in a Workspace

Figure 3:
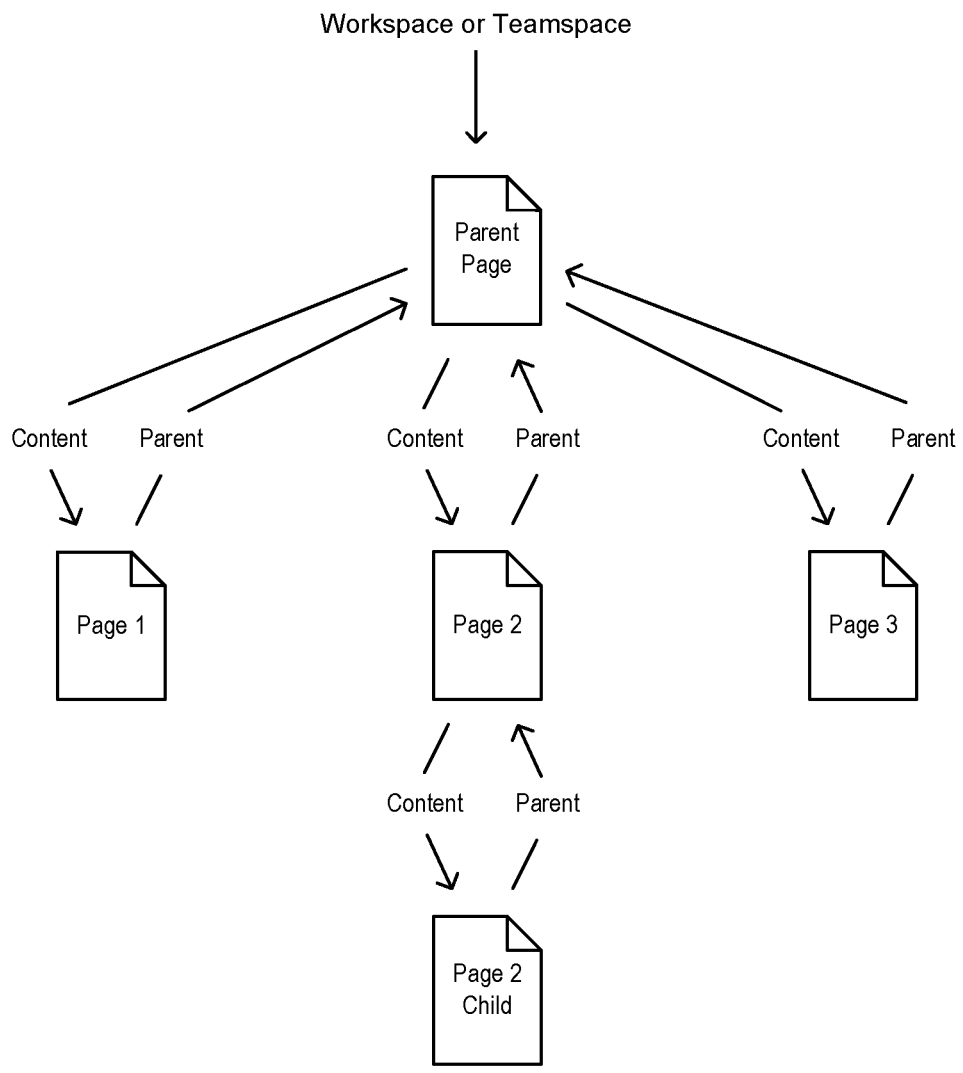
FIG. 3 is a block diagram illustrating a hierarchical organization of pages in a workspace.

FIG. 3 is a block diagram illustrating a hierarchical organization of pages in a workspace. As described with respect to the block data model of the present technology, a workspace can include multiple pages (e.g., page blocks). The pages (e.g., including parent pages and child or nested pages) can be arranged hierarchically within the workspace or one or more teamspaces, as shown in FIG. 3. The page can include a block such as tabs, lists, images, tables, etc.

A teamspace can refer to a collaborative space associated with a team or an organization that is hierarchically below a workspace. For example, a workspace can include a teamspace accessible by all users of an organization and multiple teamspaces that are accessible by users of different teams. Accessibility generally refers to creating, editing, and/or viewing content (e.g., pages) included in the workspace or the one or more teamspaces.

In the hierarchical organization illustrated in FIG. 3, a parent page (e.g., "Parent Page") is located hierarchically below the workspace or a teamspace. The parent page includes three children pages (e.g., "Page 1," "Page 2," and "Page 3"). Each of the child pages can further include subpages (e.g., "Page 2 Child" which is a grandchild of "Parent Page" and child of "Page 2"). The "Content" arrows in FIG. 3 indicate the relationship between the parents and children while the "Parent" arrows indicate the inheritance of access permissions. The child pages inherit access permission from the (immediate) parent page under which they are located hierarchically (e.g., which is above them in the tree). For example, "Page 2" inherited the access permission of the "Parent page" as a default when it was created under its parent page. Similarly, "Page 2 Child" inherited the access permission of the parent page as a default when it was created under its parent page. "Parent Page," "Page 2," and "Page 2 Child" thereby have the same access permission within the workspace.

The relationships and organization of the content can be modified by changing the location of the pages. For example, when a child page is moved to be under a different parent, the child page's access permission modifies to correspond to the access permission of the new parent. Also, when the access permission of "Parent Page" is modified, the access permission of "Page 1," "Page 2," and "Page 3" can be automatically modified to correspond to the access permission of "Parent Page" based on the inheritance character of access permissions.

In contrast, however, a user can modify the access permission of the children independently of their parents. For example, the user can modify the access permission of "Page 2 Child" in FIG. 3 so that it is different from the access permission of "Page 2" and "Parent Page." The access permission of "Page 2 Child" can be modified to be broader or narrower than the access permission of its parents. As an example, "Page 2 Child" can be shared on the internet while "Page 2" is only shared internally to the users associated with the workspace. As another example, "Page 2 Child" can be shared only with an individual user while "Page 2" is shared with a group of users (e.g., a team of the organization associated with the workspace). In some implementations, the hierarchical inheritance of the access permissions described herein can be modified from the previous description. For example, the access permissions of all the pages (parent and children) can be defined as independently changeable.

Page Layout Types

In some implementations, pages can have a page layout type. A page layout type can define a set of standardized properties, content, organization, and so forth. Page layout types can include, for example and without limitation, a task layout, a project layout, a wiki layout, a meeting layout, and/or a document layout. Page layout types can, for example, define a consistent layout for pages and can be designed for presenting certain types of content.

FIGS. 4A-4D are diagrams that illustrate examples of various page layout types. It will be appreciated that these are merely for illustration, and other page types are possible and/or the layouts of the illustrated page types can be different from the layouts illustrated in FIGS. 4A-4D.

Figures 4A, 4B:
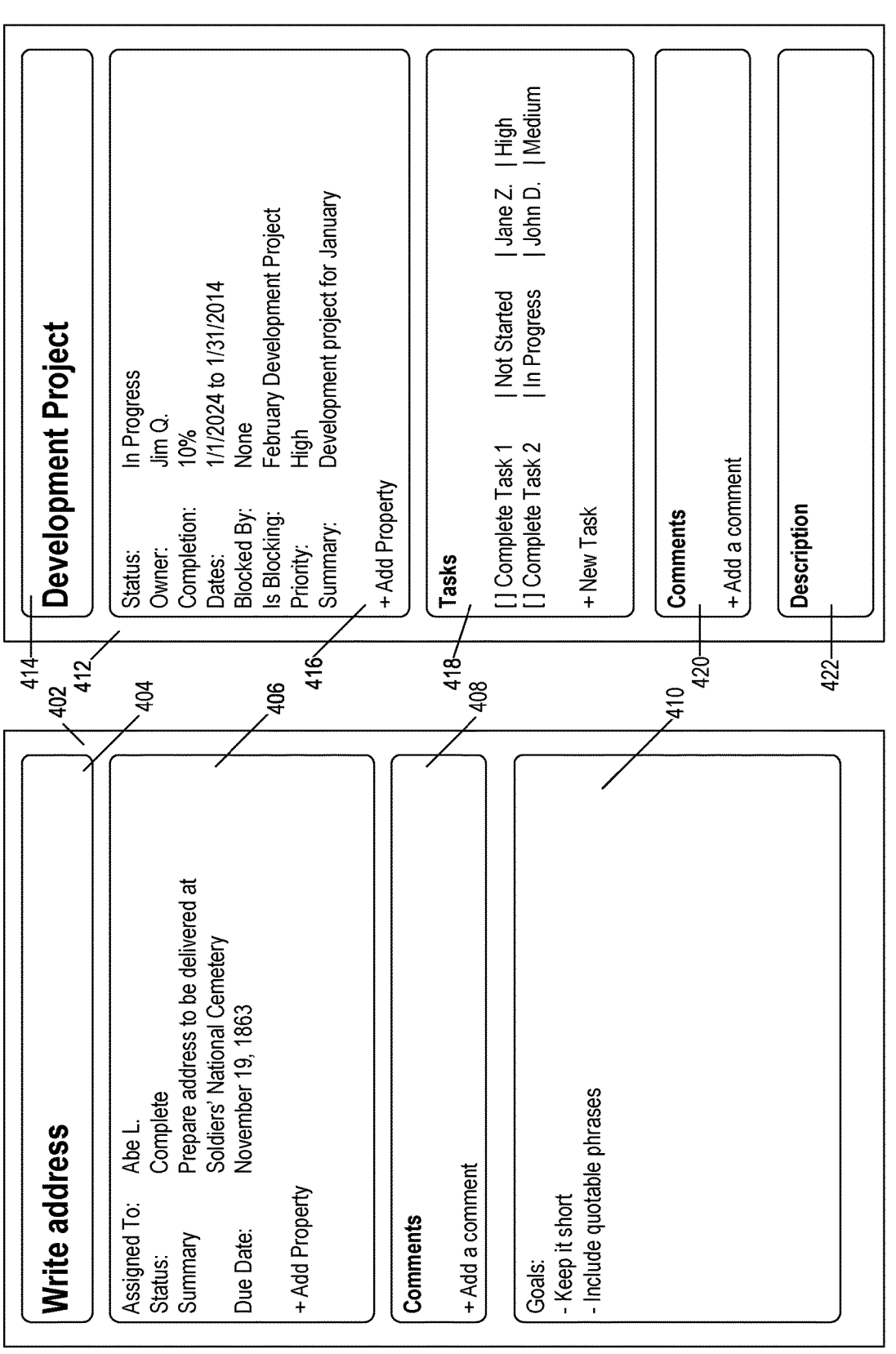
FIG. 4A is a diagram that illustrates an example task page according to some implementations.
FIG. 4B is a diagram that illustrates an example project page according to some implementations.

FIG. 4A is a diagram that illustrates an example task page according to some implementations. The task page 402 can include a title module 404, a properties module 406, a comments module 408, and a text module 410. The properties module 406 can include properties that are important for tasks, such as the name of the person to whom the task is assigned, the status of the task, a summary of the task, and a due date of the task. In some implementations, a user can add properties to and/or remove properties from the properties module 406.

FIG. 4B is a diagram that illustrates an example project page according to some implementations. The project page 412 can include a title module 414, a properties module 416, a tasks module 418, a comments module 420, and a text module 422. The properties module 416 can include properties that are important for projects, such as the project status, project owner, completion percentage, dates for the project, indications of obstacles blocking the project, indications of other projects that are blocked by the project, project priority, a short summary of the project, and so forth. In some implementations, a user can add properties to the properties module 416. The tasks module 418 can include a list of one or more tasks associated with the project. The tasks module 418 can show information such as the task name, task status, assignee, priority, and so forth. In some implementations, a user can add additional tasks. In some implementations, a user can click on a task within the tasks module 418 to open a corresponding task page (for example, a task page as shown in FIG. 4A) for the task.

Figures 4C, 4D:
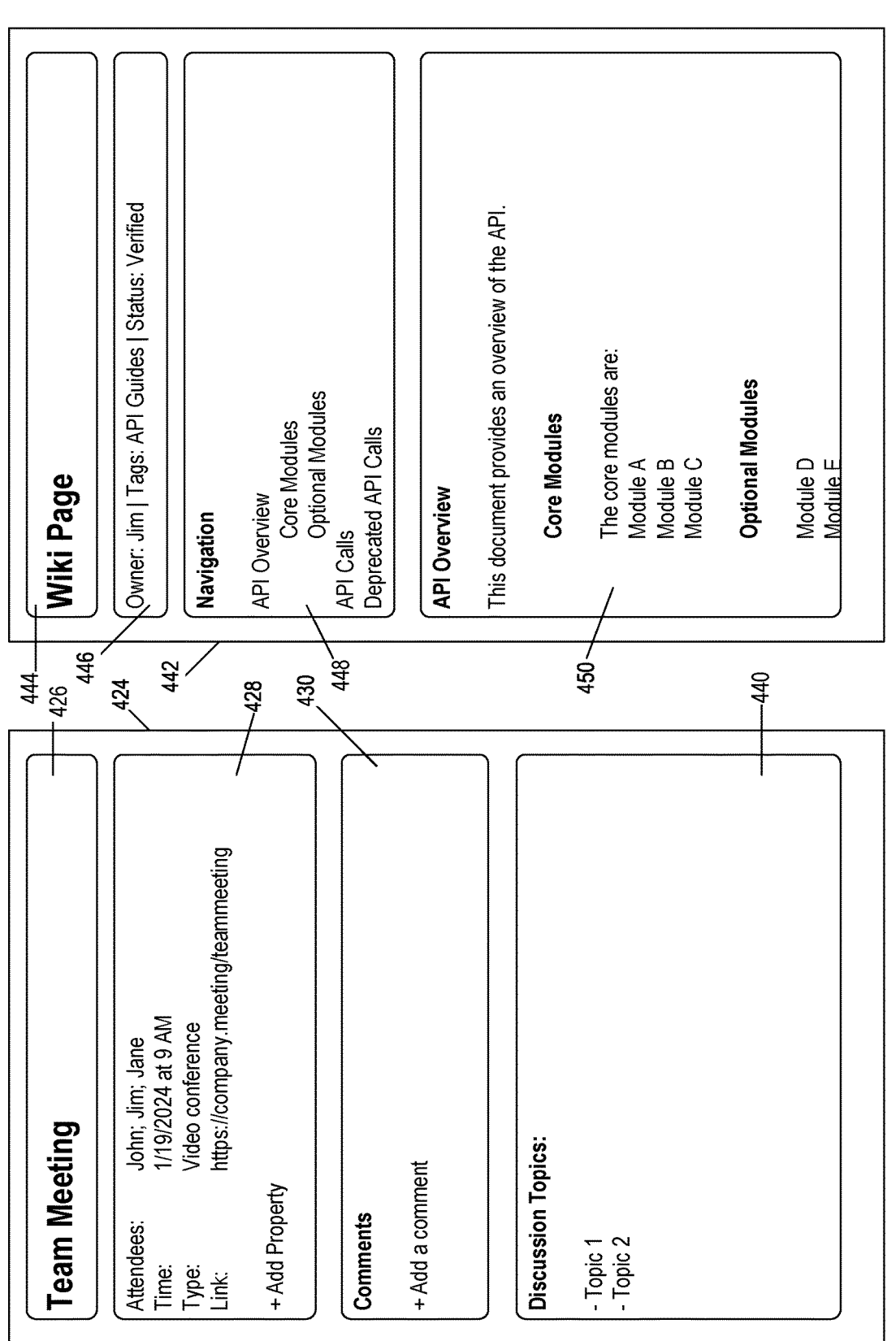
FIG. 4C is a block diagram that illustrates an example meeting page according to some implementations.
FIG. 4D is a block diagram that illustrates an example wiki page according to some implementations.

FIG. 4C is a block diagram that illustrates an example meeting page according to some implementations. The meeting page 424 can include a title module 426, a properties module 428, a comments module 430, and a text module 440. The properties module 428 can include properties such as meeting attendees, meeting time, type of meeting, a link to the meeting, and so forth. In some implementations, a user can add properties to the properties module 428. The text module 440 can contain, for example, a list of discussion topics for the meeting, links to files, web pages, etc., that are useful for the meeting, and so forth.

FIG. 4D is a block diagram that illustrates an example wiki page according to some implementations. The wiki page 442 can include a title module 444, a properties module 446, a navigation module 448, and a text module 450. The properties module 446 can include properties such as the page owner, tags for the page, and so forth. The properties module can have various configurations. For example, in FIG. 4D, a compact format is used for the properties modules, while for example, in FIG. 4B, the properties module is formatting to display more information and takes up more space. In some implementations, the properties module 446 can include an indication of a verification status of the page. In some implementations, the verification status can be manually set by a user such as the page owner. In some implementations, the verification status can automatically change whenever the page is modified. For example, if the page is modified, the verification status can automatically change from verified to awaiting verification. In some implementations, a machine learning model can be used to verify the page. For example, the machine learning model can analyze changes to the page and determine whether or not the page should still be considered verified. For example, if changes to the page are consistent with other pages, the verification status can be verified, or if the changes were insubstantial (e.g., reorganizing existing content, correcting typographical errors, etc.), the verification status can remain verified. In some implementations, a page verification status can be set to expire after a period of time (e.g., one month, six months, one year, or any other time period). In some implementations, the page verification status may not expire. For example, the page verification status can be unchanged until a user manually changes the verification status, until the page is modified, etc.

The navigation module 448 can include links to headers with the text module 450 to aid in navigation of the wiki page 442. For example, in FIG. 4D, the text module 450 includes an API Overview section, an API Calls section, and a Deprecated API Calls section (note that only the API Overview section is shown in FIG. 4D). The API Overview section includes a Core Modules subsection and an Optional Modules subsection. This structure is reflected in the navigation module 448. In FIG. 4D, all text is shown in a single module, text module 450; however, it will be appreciated that text can span multiple module. For example, in some implementations, each section or subsection can be in its own module. In some implementations, headers, subheaders, and so forth can be placed in individual modules, and the navigation module 448 can provide a navigable listing (e.g., using hyperlinks) of the heading and subheading module in the page. In some implementations, the navigation module 448 can automatically update to mirror the organization of the text module 450 or the organization of multiple modules of the wiki page 442.

Hierarchical Page Layout Templates

Individual pages can have layouts defined by page layout templates. Page layout templates can be associated with particular page types. In some implementations, the platform can provide default page layout templates for one or more page types. In some cases, however, users may wish to customize page layout templates. The approaches described herein can be used to facilitate the modification and/or creation of page layout templates. It will be appreciated that a page layout template can be different from a page layout. For example, a page layout template can define default positions for different modules, default presentation styles of different modules, and so forth. Within an individual page, a user may be able to modify the page layout, for example to rearrange blocks, add blocks, remove blocks, and so forth without changing the underlying page layout template.

In some cases, different page layout templates can have common modules. Modules can be similar to blocks for individual pages, with the key difference being that modules are part of page layout templates rather than individual pages. For example, different page layout templates can have common features such as a header module, navigation module, comment module, content module, properties module, etc. In some cases, an organization may want to define a general look and feel, such as common header styles, common modules, common fonts, etc. However, different page layout templates for different page types may have different modules (e.g., some pages may have comments enabled while others may not show a comments module), different module organizations, and so forth. For example, a "Tasks" (or "To Do") page can have a layout that includes a list of task items, while a "Project" page can include a timeline view that shows various tasks to be completed as part of the project. A "Document" page can place an emphasis on content, while a "Meeting" page can emphasize meeting details such as time, date, attendees, link to a web conference, etc.

In some cases, it can be desirable for different documents of the same page type to have somewhat different layouts. For example, a document related to the development of a software feature can have a different layout than a document related to human resources procedures. Achieving consistency among similar pages (e.g., developer documentation pages or HR procedure pages) can be difficult if each page has to be customized from a default page layout template. Accordingly, users may want to create different page layout templates that can be applied to different pages, collections of pages, etc. For example, in some implementations, a user may wish to apply a particular page layout template to all documents in a first database (e.g., a Human Resources database) and a second page layout template to all documents in a second database (e.g., a Developer Documentation database). In some implementations, page layout templates can be applied within a particular scope. A scope can be a grouping of hierarchically organized blocks of a render tree (e.g., a collection of pages, all pages in a database, a teamspace, a workspace, etc.). In some implementations, custom page types can be created, and a page layout template can be associated with all pages having a particular custom page type.

Creating different page layout templates for different page types and/or different subsets of documents within a page type can be a burdensome task, and maintaining consistency can be difficult. For example, if different page layout templates are entirely independent from one another, it can be difficult to maintain a consistent look and feel. For example, if each page layout template includes a company header and the company's logo changes, it can be necessary to update each page layout template to use the new logo. Such approaches can require a large amount of effort to maintain and can lead to inconsistent user experiences, broken links, and other issues.

In some implementations, hierarchical page layout templates can be used to simplify page layout template creation and management. For example, a parent page layout template can include common layout features, while child page layout templates can include layouts for specific page types, subsets of pages, etc. In some implementations, multiple levels of child page layout templates can be provided. For example, a user may define a child page layout template for a subset of pages, which depends from a child page layout template for a page type, which in turn depends from a parent page layout template.

In some implementations, such a hierarchical approach can be thought of as a tree, with a parent page layout as the root node and child page layout templates for particular page types or pages within a particular scope as leaf nodes. In some implementations, there may only be a root node and one or more leaf nodes. In some implementations, there can be one or more levels of mid-level nodes, which can be intermediate layout templates. For example, a child page layout template for a collection of pages can depend from a parent page layout template (e.g., a mid-level node), which can in turn depend from another parent page layout template (e.g., a root node).

As just one example, a company can have a global parent page layout template (e.g., root node) that defines common features such as a header module and navigation module. A wiki layout template can be a child page layout template that defines specific features for wiki pages (e.g., a wiki page can include a properties block that identifies the owner, one or more tags, a verification status, etc.), followed by page content. There can be multiple child page layout templates of the wiki layout. For example, an engineering wiki layout template can inherit from the wiki layout template and can include additional modules (e.g., an engineering wiki page can include an issue tracker, a project status, etc.), remove modules, change the presentation mode of modules (e.g., to display properties in an expanded view instead of a compact view, to hide or display certain content, etc.), and so forth. Another wiki, for example a procedures wiki for a manufacturing facility, can include additional and/or different modules. For example, a procedures wiki can include a module that allows users to input feedback regarding documentation. The procedures wiki can use a different child page layout template that also depends from the wiki layout template.

In some implementations, a child page layout template can alter the presentation order of modules. For example, one page layout template can have a comments section closer to the top (e.g., before the content), while another page layout template can have the comments section closer to the bottom (e.g., after the content). As another example, some page layout templates can include a properties strip at the top of the page, while other pages may have such information at the bottom of the page.

Hierarchical layouts can provide a way for users to achieve consistency across page layouts while also offering flexibility by having multiple child page layout templates that inherit features from a parent page layout template. As discussed above, there can be multiple layers of page layout templates, which can provide a great deal of flexibility in page layout templates while maintaining consistency. In some implementations, a user can make changes to a layout within a hierarchy of page layouts, and a system can be configured to allow the user to choose whether or not to apply the layout change up and/or down the hierarchy. As an example, if a user adds a module for image attachments to a "design task" layout, the system can allow the user to choose if they want to apply the change tasks lower in the hierarchy, such as "project design task" or "brand design task," and/or the user could choose to apply the change upwards in the hierarchy, for example to a general task layout.

In some implementations, a page layout template can be represented as a JSON file. The JSON file can include, for example, a layout identifier (id), a parent identifier (parent_id), a list of included modules, a list of removed modules, a presentation order of the modules, and so forth. Using JSON files can be advantageous as they are easily machine-readable and human-readable. Other types of representations are possible, such as Liquid, JavaScript, XML, and so forth.

Figure 5:
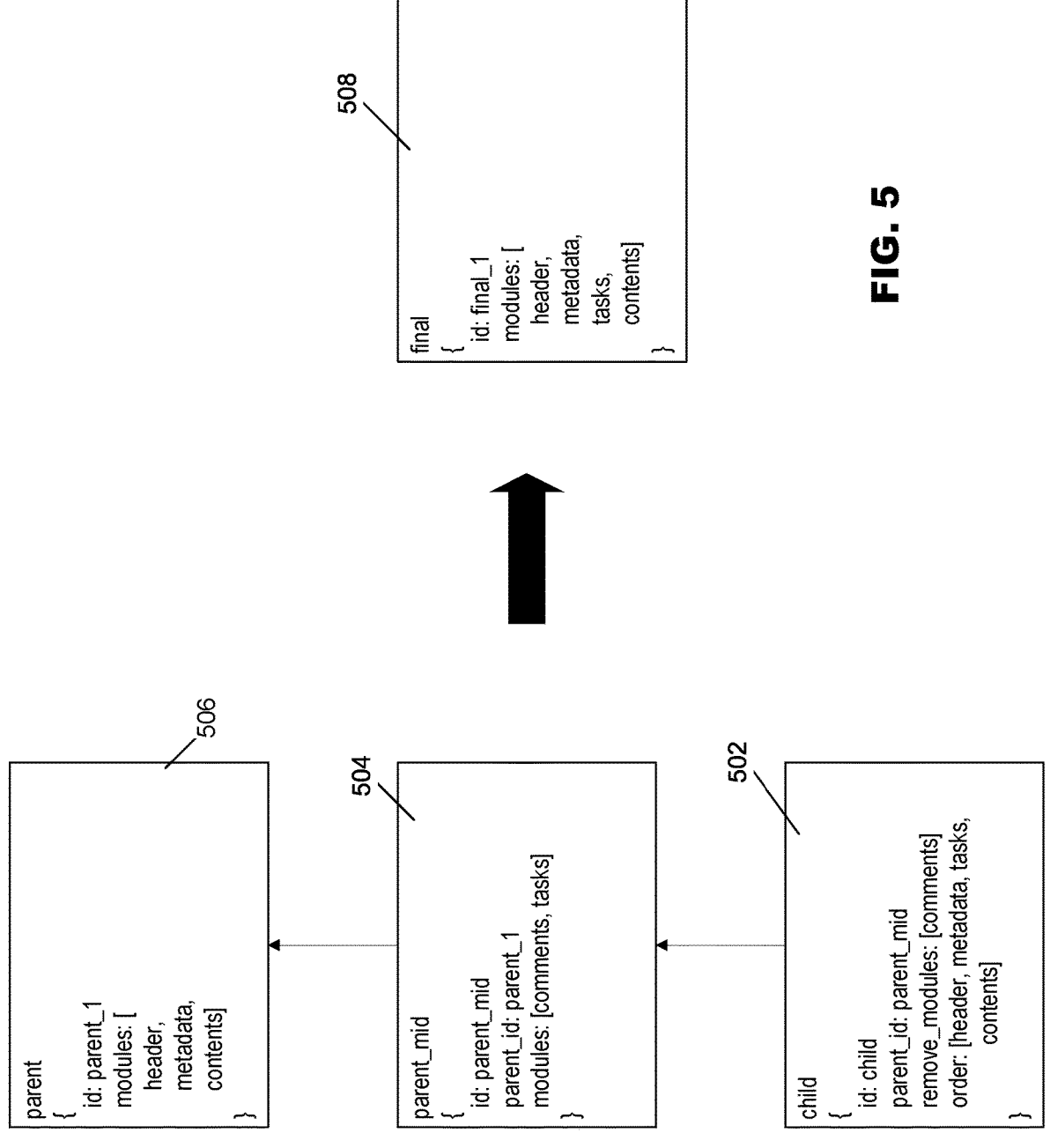
FIG. 5 is a block diagram that illustrates an example of hierarchical page layout templates according to some implementations.

FIG. 5 illustrates an example of hierarchical page layout templates according to some implementations. In FIG. 5, a child page layout template 502 (child) can include an id of the child page layout template ("child"), an identifier of the parent page layout template 504 (parent_mid), a list of modules to remove, and an order of modules for presentation on a page. The child page layout template 502 can depend on the parent page layout template 504, which can include an identifier (parent_mid), a parent identifier (parent_1), and a list of modules. The parent page layout template 504 can depend from the parent page layout template 506 (parent_1), which can include an identifier (parent_1) and a listing of modules to include in a page. It will be appreciated that, in some implementations, any child page layout template can add, remove, reorder, and/or modify modules. In FIG. 5, the parent page layout template 506 is a root node as it does not depend from another page layout template (e.g., there is no parent_id defined for the parent page layout template 506). In FIG. 5, a final layout template 508 can be computed from the child page layout template 502, parent page layout template 504, and parent page layout template 506. The final layout template 508 can be based on the parent page layout template 506, which is modified to include the changes indicated in the parent page layout template 504, and the resulting layout can be modified to include the changes indicated in the child page layout template 502. As shown in FIG. 5, the parent page layout template 506 includes the modules header, metadata, and contents. The parent page layout template 504 adds the modules comments and tasks, and the parent page layout template 506 removes the comments modules and reorders the remaining modules, resulting in a final layout template 508 that includes an ordered list of included modules: header, metadata, tasks, contents.

In some implementations, page layout templates can be computed dynamically, for example in response to a user request for a page. In such cases, the computed layout template may not be stored. In some implementations, the computed layout template can be stored or cached and can be reused when the same user or another user requests the page and/or requests another page that uses the same computed final page layout template.

In some implementations, page layout templates can be pre-computed. For example, if a user defines a child page layout template as depending from a parent page layout template, when the user modifies the parent page layout template and/or the child page layout template, a new page layout template can be computed from the child and parent page layout templates, and any pages that use the child page layout template can be modified to instead use the computed page layout template. In such implementations, when a page layout template used to create the computed layout changes (e.g., the child page layout template or parent page layout template, or any mid-level page layout templates, if they exist), the computed page layout template can be recomputed. In some cases, previous versions of computed page layout templates can be stored so that a computed page layout template can be rolled back to a previous version. In some cases, previous versions of a computed page layout template may not be saved, and if a user rolls back a child page layout template or parent page layout template, the computed page layout template can be recomputed and updated.

In the case of dynamic page layout templates, in some implementations, dynamic page layout templates can be computed on a server before a page is generated and provided to a requesting user. In some implementations, dynamically generated page layout templates can be generated on a client. The latter approach can reduce processing demands on the server, but can raise concerns regarding data usage, security, and so forth. For example, if a child page layout template hides a module that is included in the parent page layout template and the computed page layout template is computed on the client, content of the hidden module, although not displayed to the user, can be transmitted to the client, resulting in additional data transfer usage and potentially presenting a security risk if the user (or another party) is able to monitor the data being transferred to the client.

In some implementations, hierarchical page layout templates can provide for different page layout templates for different types of users. For example, in some implementations, users can be assigned to groups, and different groups can see a page with different layouts. For example, a customer support agent viewing a system status document can be presented with a view that only shows fairly high-level summary information, while an engineer viewing the same page can be presented with additional details. Such approaches can help maintain the security and integrity of sensitive information, while ensuring that different users have access to information useful for doing their jobs. Advantageously, such an approach can allow different users to see different information without a need for building entirely separate pages for different groups of users. Such an approach can be implemented in various ways. For example, in some implementations, a child page layout template can include a user or group identifier that can specify which users and/or groups should see a page with the child page layout template.

Figure 6:
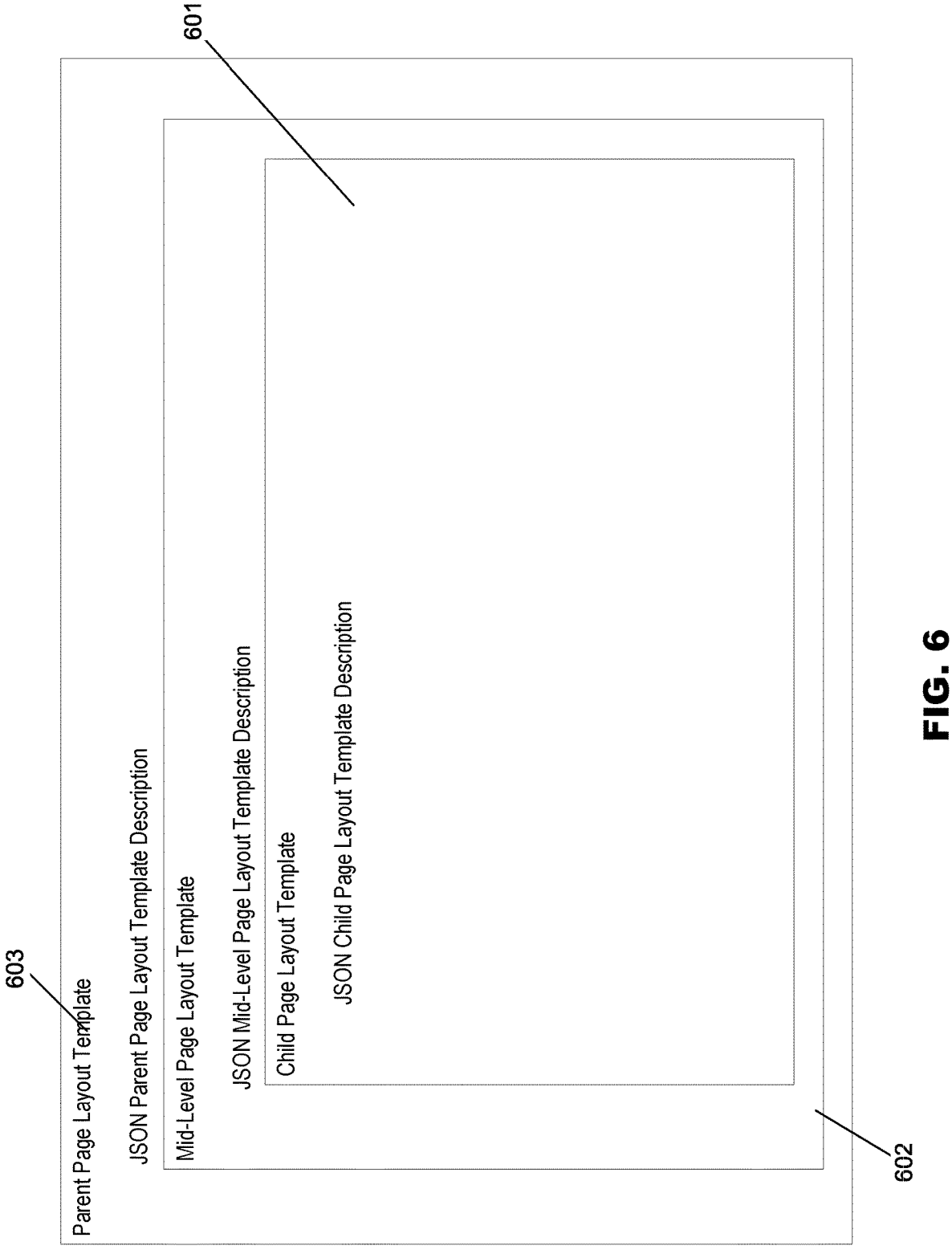
FIG. 6 is a diagram that conceptually illustrates hierarchical page layouts according to some implementations.

FIG. 6 is a diagram that conceptually illustrates hierarchical page layout templates according to some implementations. A child page layout template 601 can have a child page layout template description, which can be, for example, a JSON file. The child page layout template 601 can depend from a mid-level page layout template 602, which can have a mid-level page layout template description, which can be, for example, a JSON file. The mid-level page layout template 602 can depend from a parent page layout template 603 having a parent page layout template description, which can be, for example, a JSON file.

Figure 7:
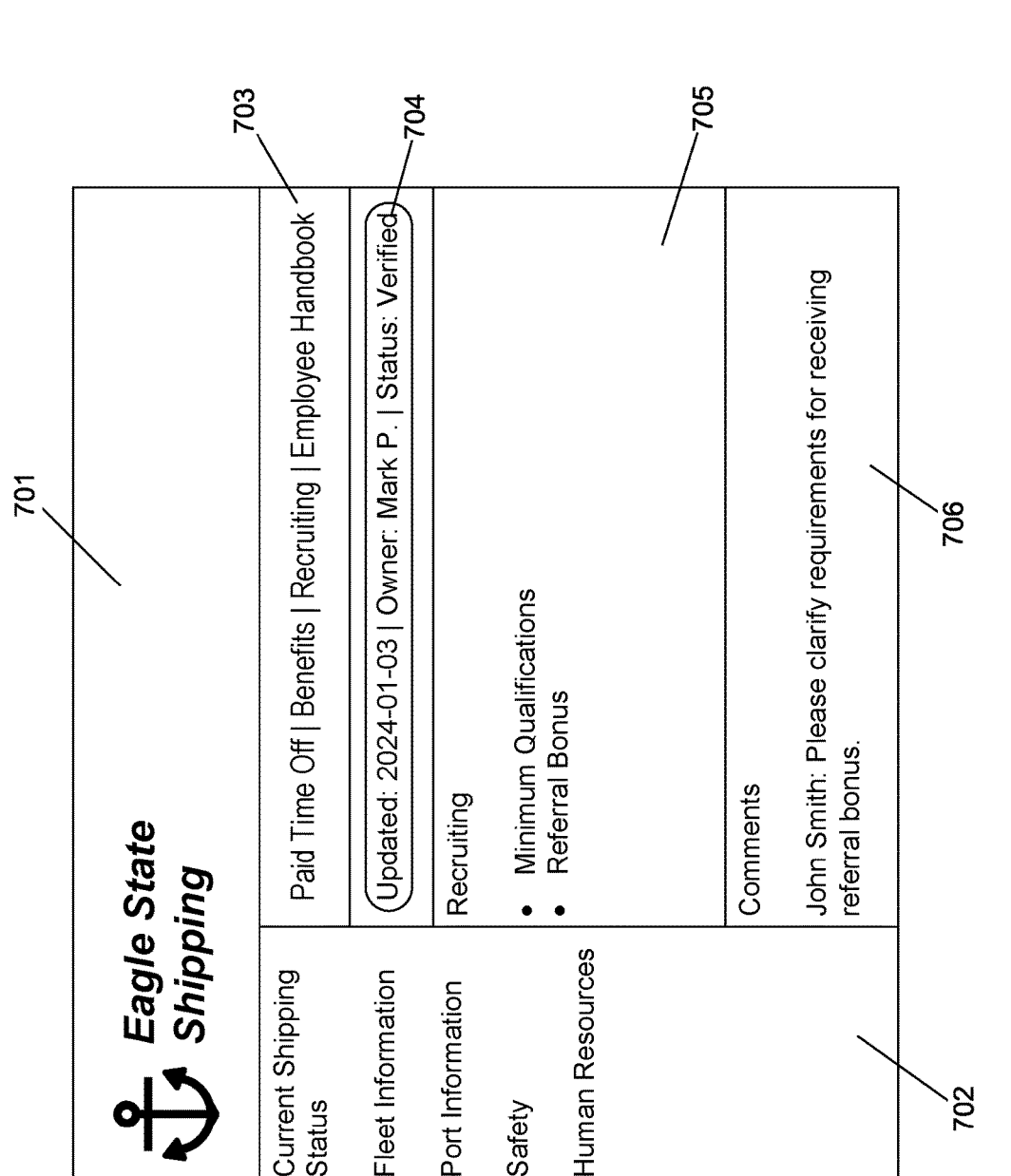
FIG. 7 is a diagram that illustrates an example of a hierarchical page layout according to some implementations.

FIG. 7 is a diagram that illustrates an example of a page created from hierarchical page layout templates according to some implementations. In FIG. 7, a page 700 can include a header 701 (e.g., a title module), a global navigation menu 702 (e.g., a navigation module), a navigation bar 703 (e.g., a second navigation module), a properties strip 704 (e.g., a properties module), a content area 705 (e.g., a content module), and a comments section 706 (e.g., a comments module). The header 701 and the global navigation menu 702 can be included in a parent page layout template. The parent page layout template can be, for example, a global layout template that is included in every page in a workspace (e.g., a root node). The navigation bar 703, properties strip 704, and content area 705 can be included in a mid-level page layout template used for all human resources pages. The comments section 706 can be included in a child page layout template that is only used for some human resources pages. For example, the comments section can be included in a recruiting page but may not be included in an employee handbook page.

Figure 8:
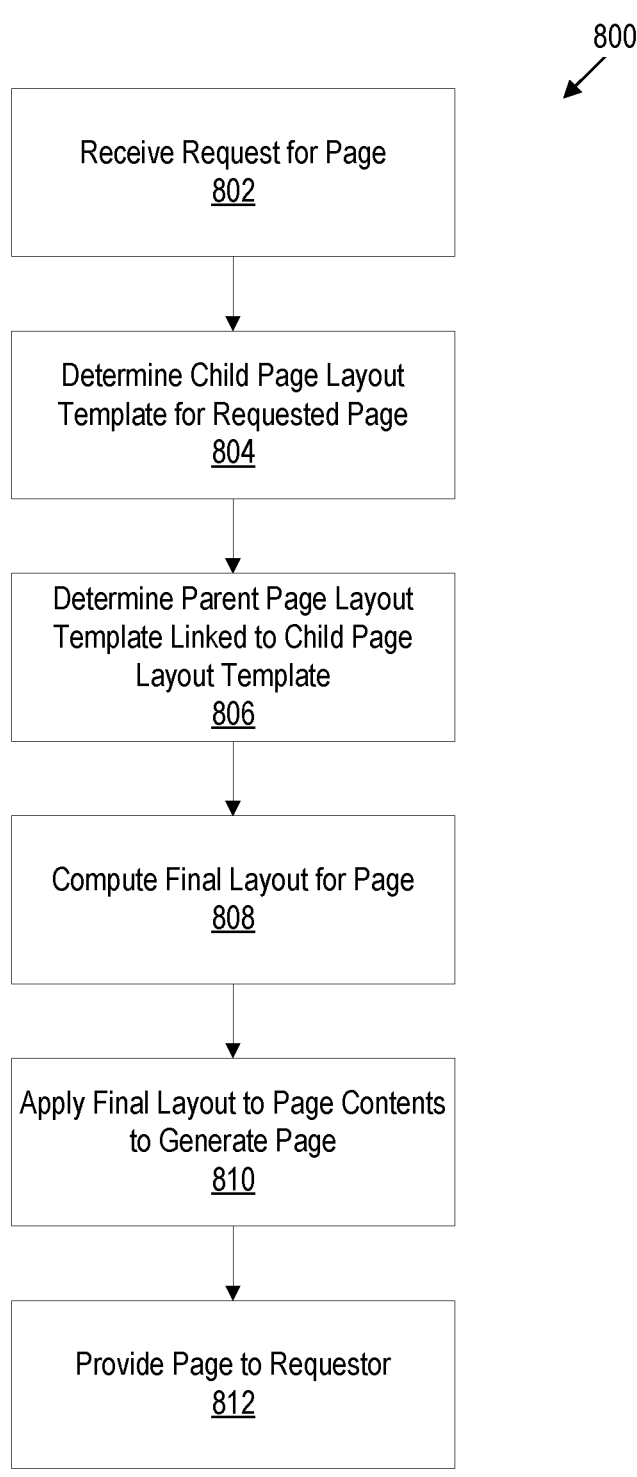
FIG. 8 is a block diagram that illustrates an example process for generating a page layout according to some implementations.

FIG. 8 is a block diagram that illustrates an example process 800 for generating a page layout template according to some implementations. In FIG. 8, page layout templates are generated dynamically in response to receiving a user request for a page. At operation 802, a system can receive a request from a user for a page. At operation 804, the system can determine a child page layout template for the requested page. At operation 806, the system can determine a parent page layout template (e.g., a root node) that is linked to the child page layout template. At operation 808, the system can compute a final page layout template based on the child page layout template and the parent page layout template. The child page layout template can inherit layout information from the parent page layout template and can modify, add, and/or remove modules included in the parent page layout template. That is, the parent page layout template can define a page layout that is inherited by the child page layout template, and the child page layout template can modify the parent page layout template.

At operation 810, the system can apply the final page layout template to the contents of the requested page to generate the requested page. At operation 812, the system can provide the requested page to the requestor.

While FIG. 8 illustrates a process that uses on-demand page layout template computation, in some implementations, page layout templates can be computed ahead of time, for example whenever a child page layout template and/or parent page layout template is edited.

Figure 9:
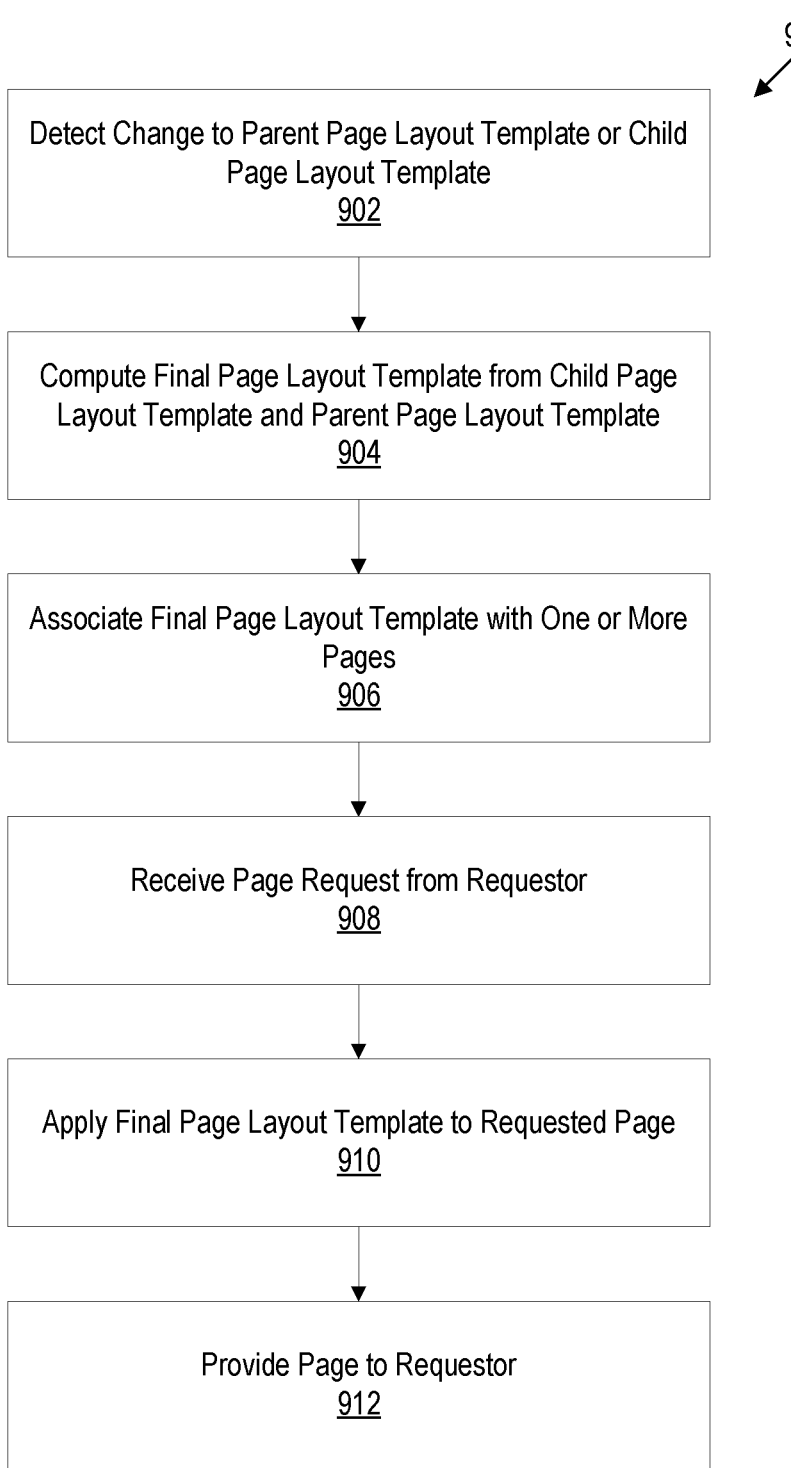
FIG. 9 illustrates an example process for ahead-of-time page layout generation according to some implementations.

FIG. 9 illustrates an example process 900 in which page layout templates are computed ahead of time (e.g., prior to receiving a user request for a page). The process 900 can be carried out on a computer system. At operation 902, the system can detect a change to a parent page layout template and/or a child page layout template (or a mid-level page layout template, if applicable). In some implementations, the change to the page layout template can be the creation of a new child page layout template. At operation 904, the system can compute a final page layout template from the child page layout template and the parent page layout template. As described herein, the child page layout template can inherit from the parent page layout template (and any mid-level page layout template on which the child page layout template depends) and can add to, modify, and/or delete parts of the parent page layout template (and/or mid-level page layout template). At operation 906, the final page layout template can be associated with one or more pages. At operation 908, the system can receive a page request from a requestor for a page associated with the final page layout template. At operation 910, the system can apply the final page layout template to the requested page. At operation 912, the system can provide the requested page to the requestor.

Page Layout Template Builder

Organizations may wish to customize pages, build custom page layouts, and so forth. However, building page layout templates can be complex and can require some knowledge of specialized languages and file formats, such as JSON, XML, HTML, CSS, and so forth. This can make it difficult for organizations to create page layout templates. Even if an organization does create page layout templates, achieving a desired layout, look, feel, and so forth can pose additional difficulties. It can also be difficult to maintain page layout templates over time, for example as the organization's branding changes or whenever the organization otherwise wishes to make changes to its page layout templates.

In some implementations, a platform can provide a page layout template builder that can simplify the process of creating page layout templates. In some implementations, the platform can provide a graphical interface that allows a user to drag and drop elements onto the page, such as headers, comments sections, content sections, properties strips, and so forth.

In some implementations, the page layout template builder can provide a preview of the page layout template. For example, in some implementations, the page layout template builder can show the contents of a particular page so that the user can obtain a live preview of how the page layout template will look when deployed. In some implementations, a user can pick an existing page to preview when designing a page layout template. For example, if the user is designing a wiki page, the user can preview existing wiki pages when designing the page layout template. Different page types can have significantly different content. Thus, providing a preview can be significant as it can give users a better sense of how a page layout template will work for a particular type of page. In some implementations, a user may not want to preview an existing page or may not have an existing page to preview. In some implementations, the platform can generate an example page that can be previewed while designing a page layout template. In some implementations, the generated example page can contain generic placeholder text. In some implementations, the generated example page can be based on content in a workspace, teamspace, etc. For example, if an organization has several wiki pages but no meeting pages (for example, because the organization has not previously used the platform for tracking meetings), a machine learning model can be used to generate an example page based on information pulled from other pages.

In some implementations, the page layout template builder can work similarly to editing a page. Such an approach can provide familiarity to users, which can make it easier for users to create page layout templates.

In some implementations, a page layout template can consist of one or more modules. In some implementations, modules can be moved around within a page layout template. In some implementations, the page layout template builder can provide a drag-and-drop interface. The dragand-drop interface can enable users to add modules, remove modules, and/or rearrange modules within a page layout template. In some implementations, the page layout template builder can enable users to configure modules. For example, in some implementations, the page layout interface builder can enable users to configure a properties module. For example, a user can select which properties should be shown in the properties module and select a type of properties module (e.g., a condensed "strip" view or a larger view that can show more information).

In some implementations, page layout templates can be applied to pages of a particular type, pages in a particular database, pages in a particular teamspace, and so forth. Thus, for example, an organization can create a page layout template that applies to all pages of a particular type or a page layout template type that applies only to particular pages or groups of pages. For example, an organization may want to use one template for pages in a database of engineering documents and another template for pages in a helpdesk repository. This can be significant as pages in different databases can have significantly different types of information contained therein. For example, engineering documents may be more complex and may include more properties (e.g., identifying the owner of the page, project status, etc.), while a support document can be relatively simple so that it can be easily digested.

In some implementations, the page layout template builder can include a versioning system. For example, when a user updates a page layout template, the previous page layout template can be stored for future use. In some implementations, the page layout template builder can provide functionality that allows users to roll back a page layout template to a previous version. This can be significant if, for example, an organization updates a page layout template and subsequently discovers an issue with the updated page layout template.

In some implementations, a page layout template can be associated with a page type, a collection of pages, etc. For example, the page layout template can include a layout identifier ("layout_id") and a parent identifier ("parent_id"). The parent identifier can identify a collection of pages with which the page layout template is associated. A collection of pages can include the layout identifier. In some implementations, the layout can include a parent table identifier that can identify the name of a collection of pages with which the page layout template is associated. These are merely examples, and different and/or additional identifiers can be used to associate pages, page types, collections of pages, etc., with particular page layout templates.

In some implementations, the page layout template builder can determine a number of pages that will be affected by an update to a page layout template. In some implementations, the page layout template builder can provide an indication to a user of the number of pages that will be impacted by updating the page layout template. In some implementations, the indicator can be displayed in the page layout template builder in a relatively subdued manner, for example disposed at a location within the page layout template builder interface such that a user can see the number of affected pages but the indicator is not actively called to the user's attention. In some implementations, the number of affected pages can be shown to the user when the user finishes modifying a page layout template. For example, the page layout template builder can be configured to display a confirmation dialog to confirm that the user wishes to save the page layout template, and the confirmation dialog can include the number of affected pages. In some implementations, the page layout template builder can provide a button for applying the page layout template, and the button can include a label indicating the number of pages that will be affected.

In some implementations, the page layout template builder can include a draft functionality. Draft functionality can be used, for example, to save a template that is in progress but which is not yet ready to be deployed. For example, a user can save a draft of a template and the user or another user can later return to the page layout template builder to continue building the page layout template.

In some implementations, the page layout template builder can include functionality that enables a staged deployment. For example, in some implementations, a user can indicate that they wish to begin deploying a new or updated page layout template, but they do not want all potentially affected pages to use the new or updated page layout template. This functionality can be used, for example, when significant changes to a page layout template are made and an organization wants to gather feedback or otherwise ensure that there are no blocking issues with the new or updated page layout template before fully deploying the new or modified page layout template.

Figure 10:
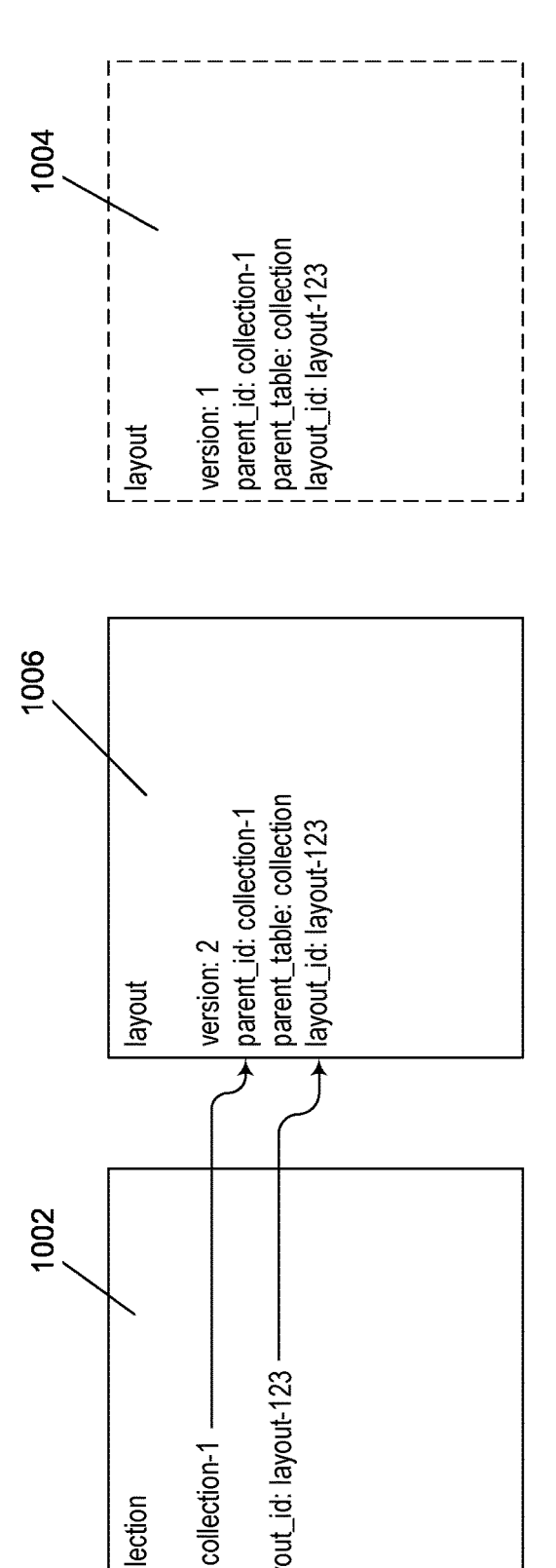
FIG. 10 is a diagram that illustrates an example of managing page layout templates according to some implementations.

FIG. 10 is a diagram that illustrates an example of managing page layout templates according to some implementations. A collection 1002 (e.g., a collection of pages, a database, a teamspace, a workspace, etc.) can have an identifier (id) and a layout identifier (layout_id). A page layout template 1004 can have a version, a parent identifier (parent_id), a parent table (parent_table), and a layout identifier (layout_id). The layout_id of the collection 1002 can be the same as the layout_id of the page layout template 1004. The id of the collection 1002 can be the same as the parent_id of the page layout template 1004. When a new version of the page layout template 1004 is created, a new page layout template 1006 can be created. The new page layout template 1006 can share some identifying information with the page layout template 1004, such as parent_id, parent_table, layout_id, and/or any other identifier. The new page layout template 1006 can have a version number that is different from a version number of the page layout template 1004. For example, when the page layout template 1004 is updated, the new page layout template 1006 can be assigned a version number that is one higher than the version number of the page layout template 1004.

Figure 11:
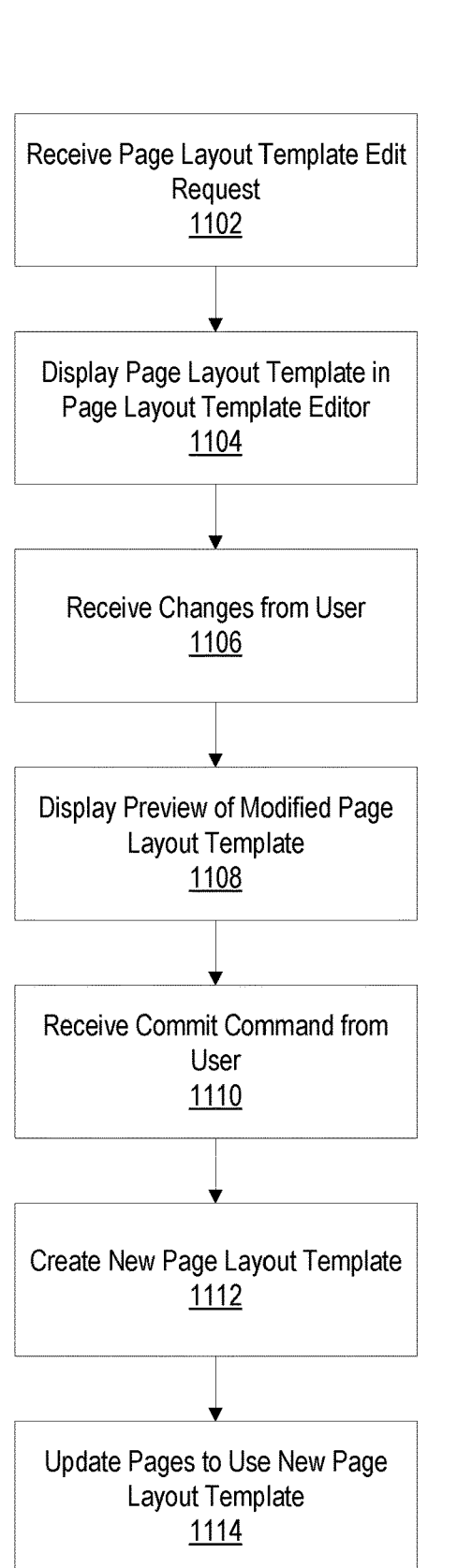
FIG. 11 is a block diagram that illustrates an example process for creating page layout templates according to some implementations.

FIG. 11 is a block diagram that illustrates an example process 1100 for creating page layout templates according to some implementations. At operation 1102, a system can receive a page layout template edit request from a user. At operation 1104, the system can display the page layout template in a page layout template editor. At operation 1106, the system can receive one or more changes to the page layout template from the user. At operation 1108, the system can display a preview of the modified page layout template to the user. As described herein, the preview can be a preview of an existing page, a preview that uses generic placeholder text, and/or a preview that uses content generated from other pages inside a workspace, teamspace, database, or any other scope. At operation 1110, the system can receive a commit command from the user. For example, the user can click a save or apply button in the page layout template editor to commit the changes to an existing page layout template and/or to save a new page layout template. At operation 1112, the system can create a new page layout template. If the user was editing an existing page layout template, the new template can be a new version of the existing page layout template. At operation 1114, the system can update one or more pages to use the new page layout template. In some implementations, the one or more pages may not be updated. For example, pages can be configured to use a page layout template with a particular name or other identifier, and the system can be configured to apply a most recent version of the page layout template or a particular version of the page layout template (for example, if a user reverts back to a previous page layout template version).

Figure 12:
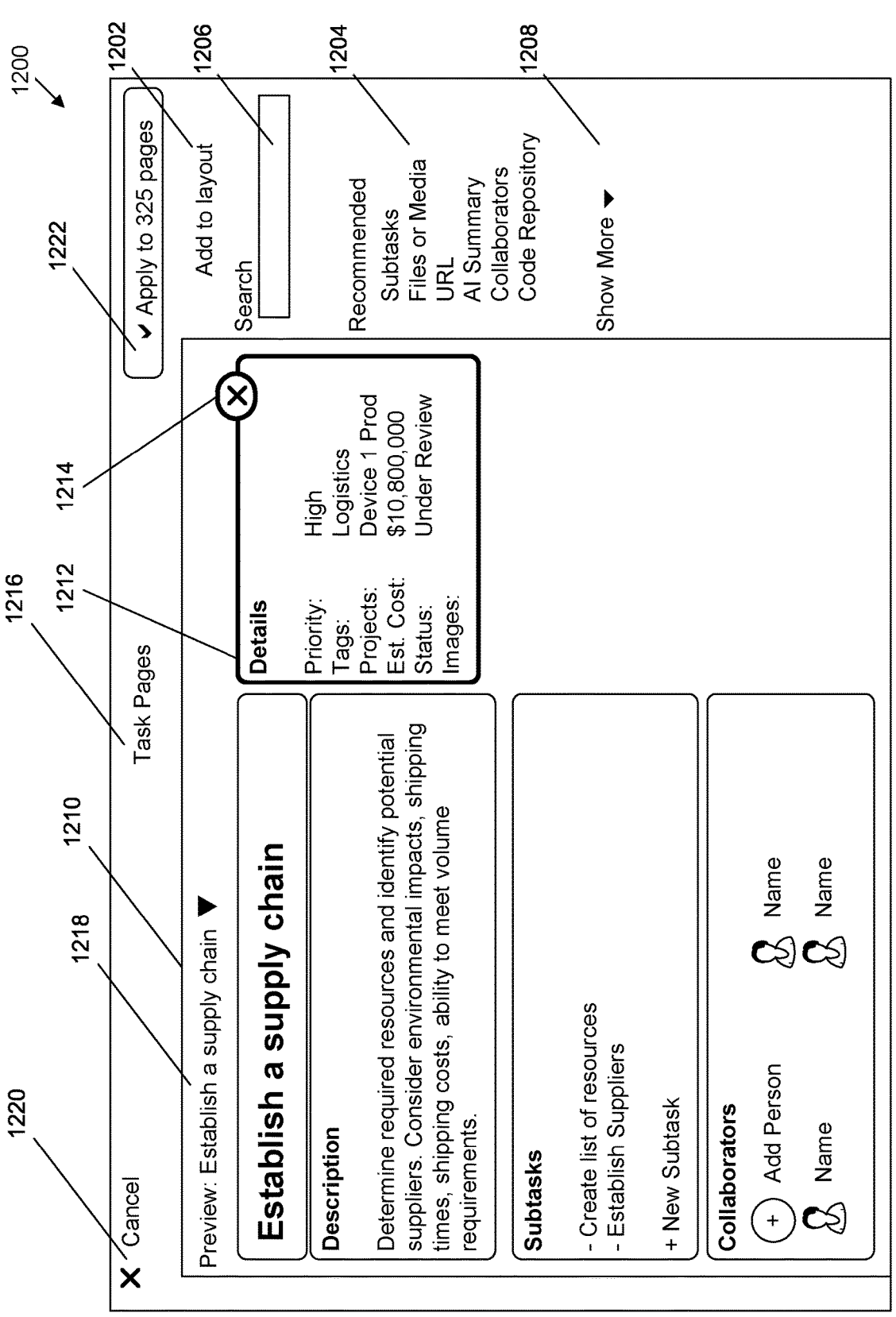
FIG. 12 is a diagram that illustrates an example page layout template builder according to some implementations.

FIG. 12 is a diagram that illustrates an example page layout template builder according to some implementations. The page layout template builder 1200 can include a page layout module pane 1202 that can include one or more modules 1204 that can be included in a page layout template. In some implementations, some of the one or more modules 1204 can be recommended modules. In some implementations, the recommended modules can be based on a page type. In some implementations, the page layout module pane 1202 can include a search box 1206 that a user can use to find modules to add to the page. In some implementations, some modules can be hidden by default, and can be discovered by searching and/or by clicking a show more button 1208. The page layout template builder 1200 can include an editing canvas 1210 that can display a preview of a page being edited. A user can drag and drop modules from the page layout module pane 1202 to the editing canvas 1210 to add modules to the editing canvas 1210. In some implementations, a user can drag a module from the editing canvas 1210 to remove the module from the page layout template. In some implementations, a user can select a module and then delete it, for example by pressing the delete key on the user's keyboard or clicking a delete button in the page layout template builder. In some implementations, a selected module 1212 can display an indication that it is selected, such as having a thicker border, differently colored border, different shading, and so forth. In some implementations, controls 1214 can be displayed on the selected module 1212. For example, the controls 1214 can include a button to remove the module from the page layout template. The page layout template builder 1200 can include a label 1216 that indicates a type of the page layout template (e.g., "Task Pages"). The page layout template builder 1200 can include a dropdown 1218 or other user interface element that can be used to select a page to preview in the editing canvas 1210. The selected page can be, for example, an existing page, a page with generic placeholder content, a page with AI-generated content, etc. The page layout template builder 1200 can include a cancel button 1220 that can enable a user to abandon editing or creating a page layout template without saving changes. The page layout template builder 1200 can include a commit button 1222 or other commit user interface element that can be used to save the layout. In some implementations, the commit button 1222 can provide an indication of the number of pages to which the page layout template will be applied.

Figure 13:
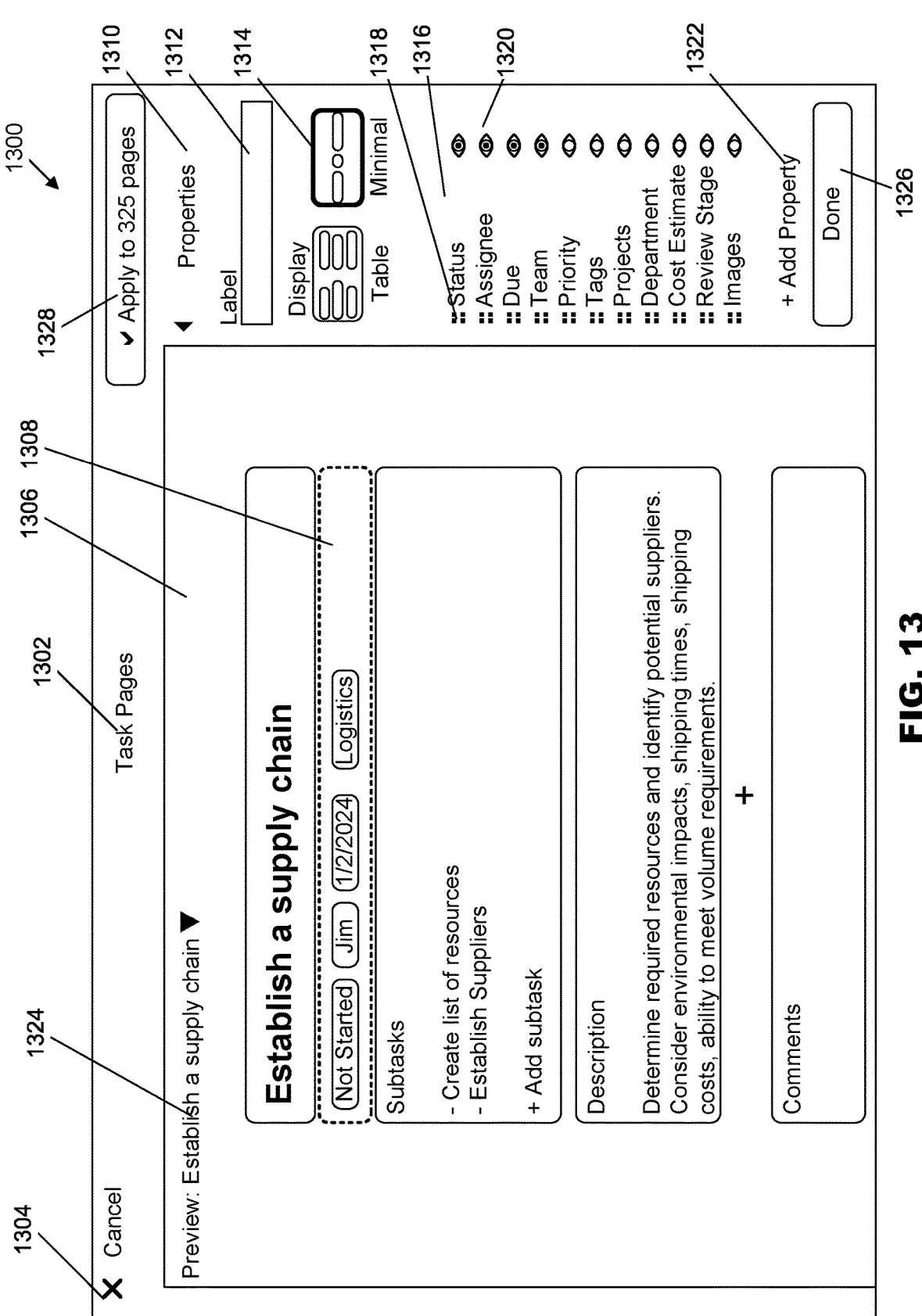
FIG. 13 is a diagram that illustrates another view of an example page layout template builder according to some implementations.

FIG. 13 is a diagram that illustrates another view of an example page layout template builder according to some implementations. The page layout template builder 1300 can include a label 1302 for the page layout template that is being edited. For example, in FIG. 13, a "Task Pages" page layout template is being edited. The page layout template builder 1300 can include a cancel button 1304 that, when selected by a user, can exit the page layout template builder without applying any changes made by the user. The page layout template builder 1300 can include an editing canvas 1306 that can display one or more modules. The editing canvas 1306 can display a page, which can be selected via the dropdown 1324. The page can be an existing page, a page containing generic placeholder content, or a page containing AI-generated content. A selected module 1308 can be indicated in the editing canvas 1306 by, for example, being displayed with a different border and/or different shading, or otherwise modified to be distinguishable from unselected modules. The page layout template builder 1300 can include a configuration pane 1310 that can be used to configure the selected module 1308. For example, the configuration pane 1310 can include an input 1312 for providing a label for the selected module 1308. In some implementations, the configuration pane 1310 can include a format selector 1314 for selecting a format of the selected module 1308. For example, in FIG. 13, a "Properties" module is selected, and the configuration pane 1310 displays options for selecting a table (or expanded) layout or a minimal (or strip) layout for the selected module 1308. The configuration pane 1310 can show one or more items 1316 (e.g., properties) that can be shown in the selected module 1308. For example, the one or more items 1316 can include properties that could be displayed in the selected module 1308. The configuration pane 1310 can include arrangement handles 1318 that allow a user to drag and drop items to rearrange the order of items. The configuration pane 1310 can include visibility indicators 1320. In some implementations, the user can toggle the visibility indicators 1320 to determine whether or not an item is visible. In some implementations, the user can add properties (e.g., items) that are not shown by clicking the add property button 1322. For example, in some implementations, the configuration pane 1310 can show a list of commonly used properties but may not show all available properties by default, which can help to provide a simple user interface that does not overwhelm the user, while still providing functionality that allows users to add additional properties. The configuration pane 1310 can include a commit button 1326 that can be used to confirm the user's changes to the module configuration. The page layout template builder 1300 can include a confirmation button 1328 that can be used to save the page layout template. In some implementations, the confirmation button 1328 can provide an indication of a number of pages to which the page layout template will be applied.

In some implementations, the page layout template builder can include functionality that allows a user to change a page display mode. For example, in FIGS. 12 and 13, a desktop display mode is shown. However, a user may also want to see and/or customize how a page layout template would appear when viewed on a mobile device such as a smartphone. In some implementations, the page layout template builder can include a toggle or other user interface element that allows the user to switch between desktop and mobile display modes.

In some cases, a user may wish to describe a page layout template, for example in plain language terms, and rely on a computer system to generate a corresponding page layout template. In some implementations, an LLM can be used to generate a page layout template from a description provided by the user. Such an approach can be advantageous when a drag-and-drop page layout template builder is not available, a user does not wish to use the drag-and-drop page layout template builder, or the user wishes to create a page layout template that is difficult or not possible to create using the drag-and-drop page layout template builder. In some implementations, a user may use a combination of natural language description and a graphical page layout template builder to achieve a desired layout, for example generating a page layout template using natural language and then modifying the generated page layout template using the graphical page layout template builder.

Figure 14:
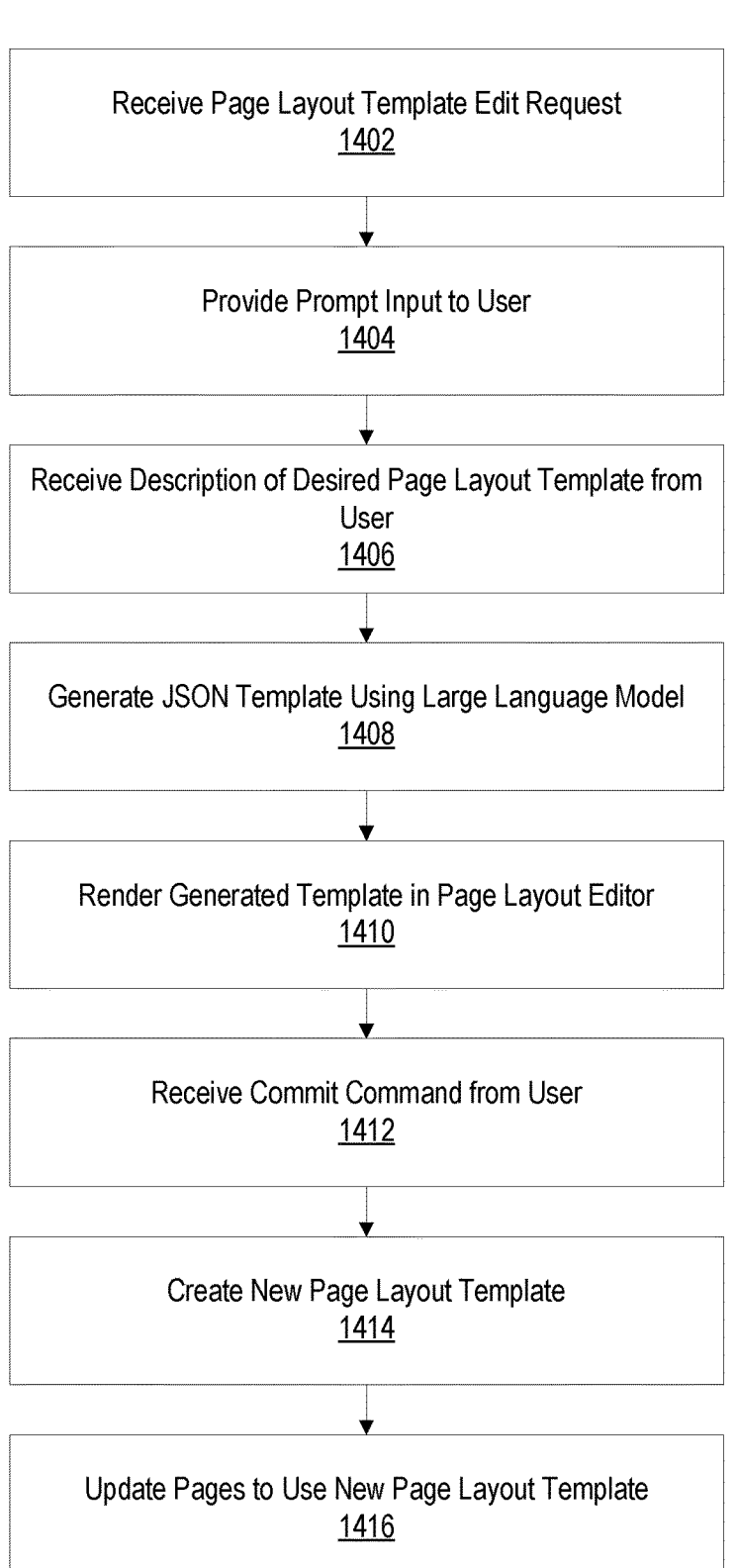
FIG. 14 is a block diagram that illustrates an example page layout template editing process according to some implementations.

FIG. 14 is a block diagram that illustrates an example page layout template editing/creation process according to some implementations. The process 1400 can be carried out on a computer system. At operation 1402, the computer system can receive a request to edit a page layout template from a user. At operation 1404, the computer system can provide a prompt input to the user. At operation 1406, the computer system can receive a description of the desired page layout template from the user. At operation 1408, the computer system can provide the description as part of a prompt to an LLM and can generate a page layout template (e.g., a JSON page layout template) using the LLM. At operation 1410, the computer system can render the generated page layout template in a page layout template editor or viewer, for example in a page layout template editor as described herein. The user can review and/or make changes to the generated page layout template. At operation 1412, the computer system can receive a commit command from the user. For example, the user can click a button to apply the generated page layout template. At operation 1414, the computer system can create a new page layout template. In some implementations, the new page layout template can be a new, original page layout template or can be a new version of an existing page layout template. At operation 1416, the computer system can update one or more pages to use the new page layout template. As described above, in some cases pages may not be updated but instead the computer system can be configured to use the latest version of a page layout template associated with a page.

News Feed Generator

A workspace, teamspace, database, or other scope can include a large number of pages, documents, databases, task lists, projects, and so forth. In some cases, a user may have access to multiple teamspaces, databases, projects, task lists, documents, pages, etc. This can make it difficult for a user to keep track of changes. As a result, users may not be aware of significant updates, such as changes to a project specification, updates to human resources policies, etc.

Organizations have historically relied upon manually tracking updates and informing users of updates, but this process is time-intensive and prone to errors and oversights. In some cases, software can show a list of recently updated pages, but may not indicate what changes were made or provide a summary of changes, making it difficult for users to understand what changes have been made.

In some implementations, a platform can monitor a scope (e.g., a workspace, teamspace, database, etc.) for changes (e.g., modifications, additions, and/or deletions), and can provide a summary of the modifications, additions, and/or deletions. For example, in some implementations, the platform can use the MessageStore update service described herein to determine changes. For example, in some implementations, the platform can detect a change in a block of a page comprising one or more blocks. In some implementations, a change can be a change to one or more properties and/or to content within a page or within a block. In some implementations, a large language model can be used to summarize additions and/or modifications. For example, if a page is updated (e.g., by a user or by a system configured to modify a page), the original page (e.g., the page before the modification) and the modified page can be provided to an LLM as part of a prompt that instructs the LLM to generate a summary of the differences between the original page and the modified page. In some implementations, when a new page is added, the new page can be provided to an LLM as part of a prompt that instructs the LLM to generate a summary of the new page.

In some implementations, a news feed that summarizes changes can be provided on a page, such as an initial page displayed to a user when the user accesses the platform. In some implementations, the news feed can be updated on a regular basis, for example hourly, daily, weekly, or on any other schedule. In some implementations, the news feed can be updated in response to a user visiting a page that includes the news feed. In some implementations, the news feed can be updated in response to detecting a change. In some implementations, the news feed can include links to modified pages and/or added pages.

In some implementations, a separate LLM prompt can be provided for each change, and the LLM can provide a plurality of responses. For example, a plurality of calls can be made to the LLM and a plurality of responses can be received from the LLM. Each LLM response can be combined or aggregated to generate a news feed with a summary of the changes. In some implementations, changes can be batched or aggregated and submitted as a single prompt to an LLM, e.g., in a single call to the LLM.

In some implementations, summaries of changes can drop off the news feed. For example, a news feed can be configured to display a summary of changes within a particular time period (e.g., the last day, last week, last month, last quarter, last year, etc.) and/or can be configured to display only a limited number of changes (e.g., the 10 most recent changes, 20 most recent changes, etc.).

Figure 15:
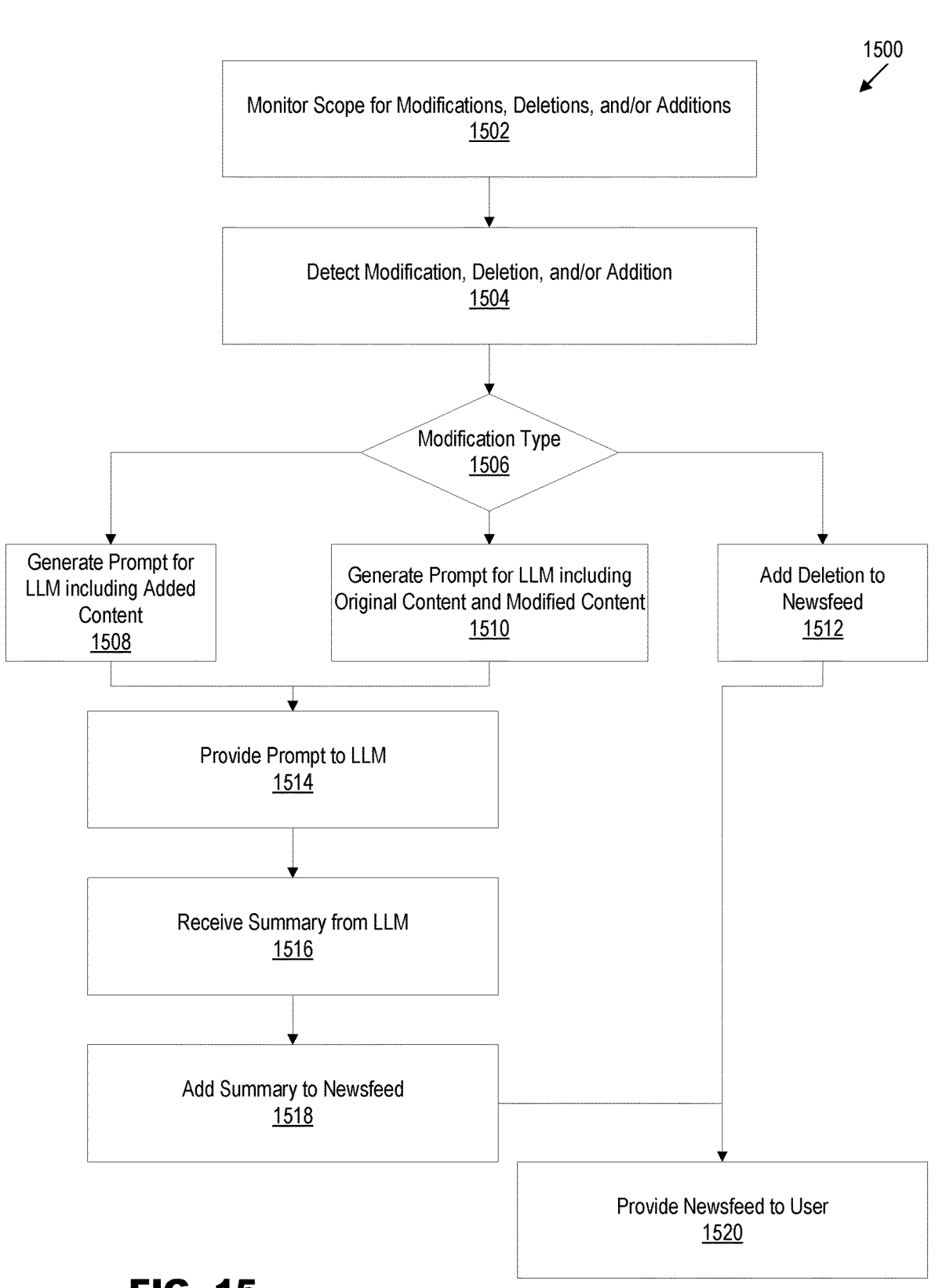
FIG. 15 is a block diagram that illustrates an example process for generating a news feed according to some implementations.

FIG. 15 is a block diagram that illustrates an example process for generating a news feed according to some implementations. The process 1500 can be run on a computer system. At operation 1502, the system can monitor a context scope for modifications, deletions, and/or additions. At operation 1504, the system can detect a modification, deletion, and/or addition. At operation 1506, the system can determine a modification type. If the modification type is an addition, the system can, at operation 1508, generate a prompt for an LLM including the added content. The prompt can instruct the LLM to generate a summary of the added content. If the modification type is a modification to an existing page, the system can, at operation 1510, generate a prompt for an LLM that includes the original content and the modified content and/or that includes one or more differences between the original content and the modified content. The prompt can instruct the LLM to generate a summary of the changes between the original content and the modified content. If the modification type is a deletion, the system may not utilize an LLM but may instead add information about the deletion to a news feed at operation 1512. In the case of an addition or modification, the system can, at operation 1514, provide the generated prompt to the LLM. At operation 1516, the system can receive a summary from the LLM. At operation 1518, the system can add the received summary to the news feed. At operation 1520, the system can provide the news feed to a user.

In some implementations, a system can be configured to provide contextual information to the LLM. The contextual information can include, for example, other pages within the scope. The contextual information can provide information that can be useful for generating summaries. For example, the contextual information can help to identify relationships, define terminology, and so forth.

In some implementations, the news feed can include a verification status of the modifications, modified pages, and/or added pages. In some implementations, the verification status can be determined using a machine learning model configured to determine a confidence level in a veracity of the modification or addition. In some implementations, the veracity can be based on one or more of a significance of changes (e.g., when a page is modified to correct typographical errors, its verification status may be unchanged), a consistency of the changes (e.g., whether or not modifications or additions are internally consistent and/ or are consistent with other content (e.g., with other pages)), and/or the author of the changes. For example, if a page owner updates a page, the confidence level can be high, but the confidence level may be lower if the change is made by a user other than the owner, and may be lower still if the modification is made by a new user or a user who has not previously modified the page or whose previous changes have been rejected. In some implementations, the indication of the verification status can be the confidence level itself. In some implementations, the indication can be based on the confidence level. For example, if the confidence level is above a first threshold, the indication can indicate that the changes are verified, while if the confidence level is between a second, lower threshold and the first threshold, the indication can indicate moderate confidence in the changes, and if the confidence level is below the second threshold, the indication can indicate low confidence in the changes. In some implementations there can be more or fewer thresholds. For example, in some implementations, changes can be verified if they are equal to or greater than a first confidence level and not verified if they are below the first confidence level.

Computer System

Figure 16:
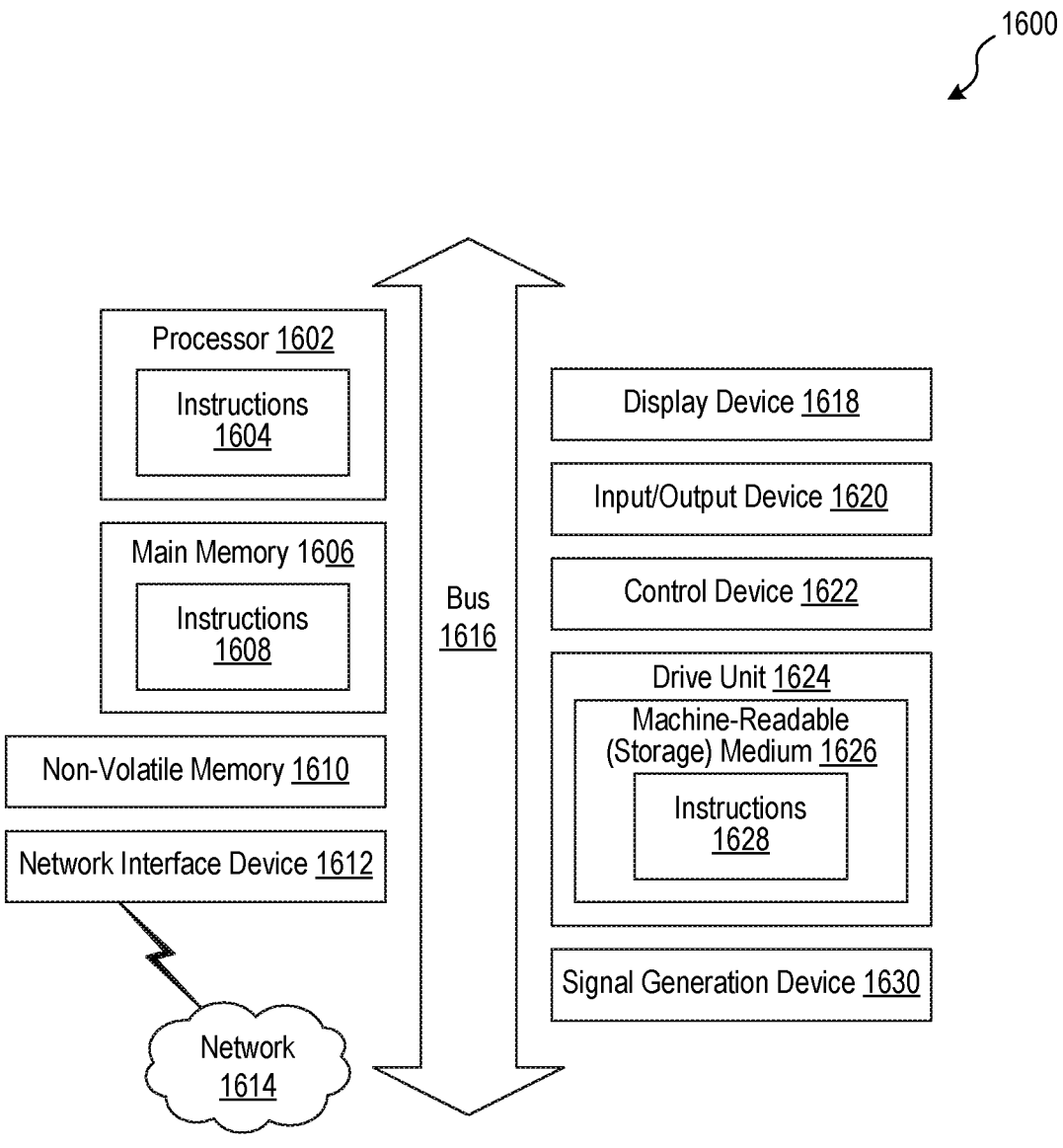
FIG. 16 is a block diagram that illustrates an example of a computer system in which at least some operations described herein can be implemented.

FIG. 16 is a block diagram that illustrates an example of a computer system 1600 in which at least some operations described herein can be implemented. As shown, the computer system 1600 can include: one or more processors 1602, main memory 1606, non-volatile memory 1610, a network interface device 1612, a display device 1618, an input/output device 1620, a control device 1622 (e.g., keyboard and pointing device), a drive unit 1624 that includes a machine readable (storage) medium 1626, and a signal generation device 1630 that are communicatively connected to a bus 1616. The bus 1616 represents one or more physical buses and/or point-to-point connections that are connected by appropriate bridges, adapters, or controllers. Various common components (e.g., cache memory) are omitted from FIG. 16 for brevity. Instead, the computer system 1600 is intended to illustrate a hardware device on which components illustrated or described relative to the examples of the figures and any other components described in this specification can be implemented.

The computer system 1600 can take any suitable physical form. For example, the computer system 1600 can share a similar architecture as that of a server computer, personal computer (PC), tablet computer, mobile telephone, wearable electronic device, network-connected ("smart") device (e.g., a television or home assistant device), AR/VR system (e.g., head-mounted display), or any electronic device capable of executing a set of instructions that specify action(s) to be taken by the computer system 1600. In some implementations, the computer system 1600 can be an embedded computer system, a system-on-chip (SOC), a single-board computer (SBC) system, or a distributed system such as a mesh of computer systems or include one or more cloud components in one or more networks. Where appropriate, one or more computer systems 1600 can perform operations in real time, near real time, or in batch mode.

The network interface device 1612 enables the computer system 1600 to mediate data in a network 1614 with an entity that is external to the computer system 1600 through any communication protocol supported by the computer system 1600 and the external entity. Examples of the network interface device 1612 include a network adapter card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 1606, non-volatile memory 1610, machine-readable medium 1626) can be local, remote, or distributed. Although shown as a single medium, the machine-readable medium 1626 can include multiple media (e.g., a centralized/distributed database and/ or associated caches and servers) that store one or more sets of instructions 1628. The machine-readable medium 1626 can include any medium that is capable of storing, encoding, or carrying a set of instructions for execution by the computer system 1600. The machine-readable medium 1626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 1610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1604, 1608, 1628) set at various times in various memory and storage devices in computing device(s). When read and executed by the processor 1602, the instruction(s) cause the computer system 1600 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the Detailed Description above using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the Detailed Description above explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms in either this application or a continuing application.

The invention claimed is:

1. A computer-implemented method for generating a news feed, the computer-implemented method comprising:
   monitoring a scope to detect one or more changes within the scope,
      wherein the scope is a grouping of hierarchically organized blocks of a render tree, and
      wherein the one or more changes comprise at least one of: a page addition or a page modification;
   generating at least one prompt for a large language model,
      wherein the at least one prompt is configured to cause the large language model to generate at least one summary of the one or more changes, and
      wherein the at least one prompt includes data related to at least one of the one or more changes;
   providing the at least one prompt to the large language model to cause the large language model to generate the at least one summary of at least one of the one or more changes;
   receiving, from the large language model, the at least one summary of the at least one of the one or more changes;
   generating a news feed,
      wherein the news feed is configured to include a description of at least one of the one or more changes based on the received at least one summary of the at least one of the one or more changes;
   generating a page comprising the news feed; and
   providing the generated page to a user.

2. The computer-implemented method of claim 1, further comprising:
   providing information related to a change of the one or more changes to a machine learning model configured to determine a confidence level in a veracity of the change;
   determining, using the machine learning model, the confidence level in the veracity of the change; and
   providing an indication of the confidence level in the news feed,
      wherein to determine the confidence level, the machine learning model is trained to evaluate at least one of: a consistency of the change, a significance of the change, or an author of the change.

3. The computer-implemented method of claim 1, wherein the one or more changes comprise a plurality of changes,
   wherein the at one least one prompt comprises a plurality of prompts, wherein each of the plurality of prompts corresponds to a change of the plurality of changes, wherein providing the plurality of prompts to the large language model comprises:

sending a plurality of calls to the large language model, each call corresponding to a prompt of the plurality of prompts, wherein receiving the at least one summary comprises:

receiving a plurality of summaries, each summary of the plurality of summaries corresponding to a prompt of the plurality of prompts, and wherein generating the page comprising the news feed comprises:

aggregating each summary of the plurality of summaries.

4. The computer-implemented method of claim 1, wherein the at least one prompt comprises one prompt, wherein the one or more changes comprise a plurality of changes, and wherein generating the one prompt for the large language model comprises:

aggregating the plurality of changes into the one prompt; and providing an instruction to the large language model to provide a summary of each change of the plurality of changes, wherein the summary of each change is provided in a single response by the large language model.

5. The computer-implemented method of claim 1, wherein the scope comprises at least one of: one or more workspaces, one or more collections, one or more teamspaces, one or more databases, or one or more pages.

6. The computer-implemented method of claim 1, wherein the page modification comprises at least one of a modified property or a modified content.

7. The computer-implemented method of claim 1, wherein the one or more changes comprise a page modification, and wherein providing the prompt to the large language model comprises providing the modified page and a previous version of the modified page to the large language model.

8. The computer-implemented method of claim 1, wherein the one or more changes comprise a page addition, and wherein providing the prompt to the large language model comprises providing the added page to the large language model.

9. The computer-implemented method of claim 1, wherein providing the prompt to the large language model further comprises providing contextual information to the large language model.

10. The computer-implemented method of claim 9, wherein to provide the contextual information to the large language model, the method further comprises:

retrieving one or more pages included in the scope.

11. The computer-implemented method of claim 1, wherein a page comprises one or more blocks, and wherein detecting one or more changes within the scope comprises detecting a change to at least one block of the one or more blocks.

12. A non-transitory, computer-readable storage medium comprising instructions recorded thereon, wherein the instructions, when executed by at least one data processor of a system, cause the system to:

monitor a scope to detect one or more changes within the scope, wherein the one or more changes comprise at least one of: a page addition or a page modification;

generate at least one prompt for a large language model, wherein the at least one prompt is configured to cause the large language model to generate at least one summary of the one or more changes, and wherein the at least one prompt includes data related to at least one of the one or more changes;

provide the at least one prompt to the large language model to cause the large language model to generate the at least one summary of at least one of the one or more changes;

receive, from the large language model, the at least one summary of the at least one of the one or more changes;

generate a news feed, wherein the news feed is configured to include a description of at least one of the one or more changes based on the received at least one summary of the at least one of the one or more changes;

generate a page comprising the news feed; and provide the generated page to a user.

13. The non-transitory, computer-readable storage medium of claim 12, further comprising instructions to:

provide information related to a change of the one or more changes to a machine learning model configured to determine a confidence level in a veracity of the change;

determine, using the machine learning model, the confidence level in the veracity of the change; and provide an indication of the confidence level in the news feed, wherein to determine the confidence level, the machine learning model is trained to evaluate at least one of: a consistency of the change, a significance of the change, or an author of the change.

14. The non-transitory, computer-readable storage medium of claim 12, wherein the one or more changes comprise a plurality of changes, wherein the at one least one prompt comprises a plurality of prompts, wherein each of the plurality of prompts corresponds to a change of the plurality of changes, wherein providing the plurality of prompts to the large language model comprises:

sending a plurality of calls to the large language model, each call corresponding to a prompt of the plurality of prompts, wherein receiving the at least one summary comprises:

receiving a plurality of summaries, each summary of the plurality of summaries corresponding to a prompt of the plurality of prompts, and wherein generating the page comprising the news feed comprises:

aggregating each summary of the plurality of summaries.

15. The non-transitory, computer-readable storage medium of claim 12, wherein the at least one prompt comprises one prompt, wherein the one or more changes comprise a plurality of changes, and wherein generating the one prompt for the large language model comprises:

aggregating the plurality of changes into the one prompt; and providing an instruction to the large language model to provide a summary of each change of the plurality of changes, wherein the summary of each change is provided in a single response by the large language model.

16. The non-transitory, computer-readable storage medium of claim 12, wherein the scope comprises at least one of: one or more workspaces, one or more collections, one or more teamspaces, one or more databases, or one or more pages.

17. The non-transitory, computer-readable storage medium of claim 12, wherein the one or more changes comprise a page modification, and wherein providing the prompt to the large language model comprises providing the modified page and a previous version of the modified page to the large language model.

18. The non-transitory, computer-readable storage medium of claim 12, wherein the one or more changes comprise a page addition, and wherein providing the prompt to the large language model comprises providing the added page to the large language model.

19. The non-transitory, computer-readable storage medium of claim 12, wherein a page comprises one or more blocks, and wherein detecting one or more changes within the scope comprises detecting a change to at least one block of the one or more blocks.

20. A system comprising:

at least one hardware processor; and at least one non-transitory memory storing instructions which, when executed by the at least one hardware processor, cause the system to:

monitor a scope to detect one or more changes within the scope, wherein the scope is a grouping of hierarchically organized blocks of a render tree, and wherein the one or more changes comprise at least one of: a page addition or a page modification;

generate at least one prompt for a large language model, wherein the at least one prompt is configured to cause the large language model to generate at least one summary of the one or more changes, and wherein the at least one prompt includes data related to at least one of the one or more changes;

provide the at least one prompt to the large language model to cause the large language model to generate the at least one summary of at least one of the one or more changes;

receive, from the large language model, the at least one summary of the at least one of the one or more changes;

generate a news feed, wherein the news feed is configured to include a description of at least one of the one or more changes based on the received at least one summary of the at least one of the one or more changes;

generate a page comprising the news feed; and provide the generated page to a user.

* * * * *